US010997096B2

(12) United States Patent
Morris et al.

(10) Patent No.: US 10,997,096 B2
(45) Date of Patent: May 4, 2021

(54) ENUMERATED PER DEVICE ADDRESSABILITY FOR MEMORY SUBSYSTEMS

(71) Applicant: Intel Corporation, Santa Clara, CA (US)

(72) Inventors: Tonia G. Morris, Irmo, SC (US); Bill Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/987,854

(22) Filed: May 23, 2018

(65) Prior Publication Data
US 2019/0042498 A1 Feb. 7, 2019

Related U.S. Application Data

(60) Provisional application No. 62/509,353, filed on May 22, 2017.

(51) Int. Cl.
*G06F 13/16* (2006.01)
*G06F 3/06* (2006.01)
(Continued)

(52) U.S. Cl.
CPC .......... *G06F 13/1684* (2013.01); *G06F 3/061* (2013.01); *G06F 3/0659* (2013.01);
(Continued)

(58) Field of Classification Search
CPC .... G06F 13/1684; G06F 3/061; G06F 3/0659; G06F 3/0673; G06F 9/30101
See application file for complete search history.

(56) References Cited

U.S. PATENT DOCUMENTS 7,349,277 B2   3/2008  Kinsley et al.
7,610,423 B2  10/2009  Gower et al.
(Continued)

FOREIGN PATENT DOCUMENTS

WO  2011064626 A1   6/2011
WO  2013109284 A1   7/2013
WO  2013191911 A1  12/2013

OTHER PUBLICATIONS

Microchip KSZ9563R Datasheet, [online] Initial Publication May 23, 2017, [Retrieved on Jun. 12, 2019], Retrieved from the Internet <URL: http://ww1.microchip.com/downloads/en/DeviceDoc/KSZ9563R-Data-Sheet-DS00002419C.pdf> (Year: 2017).*

(Continued)

*Primary Examiner* — David Yi
*Assistant Examiner* — Dustin B. Fulford
(74) *Attorney, Agent, or Firm* — Compass IP Law PC

(57) ABSTRACT

A memory subsystem enables per device addressability (PDA) to target configuration commands to one of multiple memory devices that share a select line or buffer devices that share an enable line. The system includes a host and multiple memory devices that can be coupled over a command bus and a data bus. The devices include a configuration or mode register to store a value to indicate whether PDA enumeration is enabled. When enabled, the host can provide an enumeration identifier (ID) command via the command bus with a signal via the data bus to assign an enumeration ID. After assignment of the enumeration ID, the host can send PDA commands via the command bus with the enumeration ID, without a signal on the data bus. Devices only process PDA commands that match their assigned enumeration ID, enabling the setting of device-specific configuration settings without needing to use the data bus on every PDA command.

23 Claims, 10 Drawing Sheets

(51) Int. Cl.
*G06F 9/30* (2018.01)
*G06F 12/02* (2006.01)
*G06F 1/26* (2006.01)

(52) U.S. Cl.
CPC ........ *G06F 3/0673* (2013.01); *G06F 9/30101* (2013.01); *G06F 12/02* (2013.01); *G06F 1/26* (2013.01)

(56) References Cited

U.S. PATENT DOCUMENTS

| | | | |
|---|---|---|---|
| 7,872,892 | B2 | 1/2011 | MacWilliams et al. |
| 9,037,774 | B2 | 5/2015 | Solomon et al. |
| 9,734,878 | B1 * | 8/2017 | Aquil ................ G11C 11/4082 |
| 10,153,922 | B1 * | 12/2018 | Sreeramaneni ...... G11C 7/1006 |
| 10,380,043 | B2 | 8/2019 | Morris et al. |
| 2002/0004922 | A1 | 1/2002 | Manning |
| 2004/0128433 | A1 | 7/2004 | Bains |
| 2005/0041500 | A1 | 2/2005 | Lee |
| 2005/0259506 | A1 | 11/2005 | Roohparvar |
| 2006/0106951 | A1 | 5/2006 | Bains |
| 2007/0013704 | A1 | 1/2007 | MacWilliams et al. |
| 2011/0047319 | A1 | 2/2011 | Jeon et al. |
| 2011/0063931 | A1 | 3/2011 | Linam et al. |
| 2011/0138261 | A1 | 6/2011 | Bains et al. |
| 2011/0153925 | A1 | 6/2011 | Bains et al. |
| 2011/0235459 | A1 | 9/2011 | Ware et al. |
| 2012/0239960 | A1 | 9/2012 | Priel et al. |
| 2013/0094271 | A1 | 4/2013 | Schuetz |
| 2013/0339821 | A1 | 12/2013 | Cordero et al. |
| 2013/0346684 | A1 | 12/2013 | Bains |
| 2014/0244922 | A1 * | 8/2014 | Bains ................ G11C 7/1072 711/105 |
| 2014/0372816 | A1 | 12/2014 | Bains et al. |
| 2015/0153966 | A1 | 6/2015 | Lee |
| 2017/0060790 | A1 | 3/2017 | Bialas, Jr. et al. |
| 2018/0025171 | A1 | 1/2018 | Shan et al. |
| 2018/0090185 | A1 | 3/2018 | Hossain et al. |
| 2019/0042498 | A1 | 2/2019 | Morris et al. |
| 2020/0065266 | A1 | 2/2020 | Morris et al. |

OTHER PUBLICATIONS

"Migrating to LPDDR3" in LPDDR3 Symposium 2012 in www.jedec.org/sites/default/files/Frank_Ross_LPDDR3.pdf.
DDR3 SDRAM Standard JESD79-F Jul. 2010 JEDEC www.jedec.org.
English and Korean Translation of the Notice of Preliminary Rejection, Application No. 10-2014-7030987, dated Jan. 25, 2016, 5 pages.
First Office Action for U.S. Appl. No. 15/718,346, dated Sep. 21, 2018, 10 pages.
JEDEC DDR4 Mini Workshop, Server Memory Forum 2011 www.jedec.org.
JEDEC DDR4 Standard, Sep. 2012.
Kibong Koo, etc al., A 1.2V 38nm 2.4Gb/s/pin 2Gb DDR4 SDRAM with Bank Group and x4 Half-Page Architecture, ISSCC 2012/Session 2/High Bandwidth DRAM & PRAM/2.2, Digest of Technical Papers, 2012 IEEE International Solid-State Circuits Conference, 2 pages.
Kinsley, Tom, "DDR4 Module Level Trends and Features" Micron Technology, Server Memory Forum 2011, JEDEC, 31 pages.
Notice of Allowance for U.S. Appl. No. 13/531,368, dated Sep. 22, 2020, 8 pages.
Office Action for U.S. Appl. No. 16/529,700, dated Apr. 1, 2020,10 pages.
Server Memory Forum; Perry Keller, "Understanding and Measuring the Latest Bit Error Rate Based AC Timings in DDR4 and GDDR5", Mar. 1 2012 in http://www.jedec.org/events-meetings/server-memory-forum-shenzhen/agenda.

\* cited by examiner

REGISTER 200

| | MR ADDR | OPERATING MODE | DESCRIPTION |
|---|---|---|---|
| 210 | $Mx_1Ay_1$ | PDA ENUMERATE PROGRAMMING MODE | READ ONLY MR FIELD, PROGRAMMED VIA MPC COMMAND<br><br>0 = PDA ENUMERATE PROGRAMMING MODE DISABLED<br>1 = PDA ENUMERATE PROGRAMMING MODE ENABLED<br><br>USED TO PROGRAM PDA ENUMERATE ID |
| 220 | $Mx_2Ay_2$ | PDA ENUMERATE ID [3:0] | READ ONLY MR FIELD, PROGRAMMED VIA MPC COMMAND WITH PDA ENUMERATE ID OPCODE<br><br>$XXXX_b$ = ENCODING SENT WITH MPC COMMAND WITH PDA ENUMERATE ID OPCODE – SET WHEN PDA ENUMERATE PROGRAMMING MODE ENABLED AND DQ0 ASSERTED LOW<br><br>4 BITS IN THIS EXAMPLE, WITH DEFAULT = $1111_b$ |
| 230 | $Mx_3Ay_3$ | PDA SELECT ID [3:0] | READ ONLY MR FIELD, PROGRAMMED VIA MPC COMMAND WITH PDA SELECT ID OPCODE<br><br>$1111_b$ = ALL DRAMs EXECUTE MRW, MPC, VrefCA COMMANDS<br>FOR ALL OTHER ENCODINGS, DRAMs EXECUTE MRW, MPC, VrefCA COMMANDS ONLY IF PDA SELECT ID MATCHES PDA ENUMERATE ID<br><br>POSSIBLE EXCEPTIONS FOR SPECIFIC MPC COMMANDS<br>4 BITS IN THIS EXAMPLE, WITH DEFAULT = $1111_b$ |

FIG. 2

COMMAND TABLE 500

| | COMMAND | OPCODE | USES PDA SELECT ID? |
|---|---|---|---|
| 502 | MRW | ALL | YES |
| 504 | VrefCA | ALL | YES |
| 506 | MPC | SET RTT_CA | YES |
| 508 | MPC | SET RTT_CS | YES |
| 510 | MPC | SET RTT_CK | YES |
| 512 | MPC | SET RTT_PARK | YES |
| 514 | MPC | APPLY VrefCA AND RTT_CA/CS/CK | NO |
| 516 | MPC | ENTER PDA ENUMERATE PROGRAMMING MODE | NO |
| 518 | MPC | EXIT PDA ENUMERATE PROGRAMMING MODE | NO |
| 520 | MPC | PDA ENUMERATE ID | NO |
| 522 | MPC | PDA SELECT ID | NO |
| 524 | MPC | ALL OTHER MPC OPCODES | NO |

FIG. 5

MPC OPCODES 600

| FUNCTION | OPERAND | DATA/OPCODE |
|---|---|---|
| INITIALIZATION AND TRAINING MODES | OP[7:0] | 0000 0000$_b$: EXIT CS TRAINING MODE<br>0000 0001$_b$: ENTER CS TRAINING MODE<br>0000 0010$_b$: RFU<br>0000 0011$_b$: ENTER CA TRAINING MODE<br>0000 0100$_b$: ZQCAL LATCH<br>0000 0101$_b$: ZQCAL START<br>0000 0110$_b$: STOP DQS OSCILLATOR<br>0000 0111$_b$: START DQS OSCILLATOR<br>0000 1xxx$_b$: SET RTT_CA = xxx<br>0001 0xxx$_b$: SET RTT_CS = xxx<br>0001 1xxx$_b$: SET RTT_CK = xxx<br>0010 0xxx$_b$: SET RTT_PARK = xxx<br>0010 0000$_b$: EXIT PDA ENUMERATE PROGRAMMING MODE<br>0010 0001$_b$: ENTER PDA ENUMERATE PROGRAMMING MODE<br>0010 0010$_b$: APPLY VrefCA AND RTT_CA/CS/CK<br>0100 xxxx$_b$: PDA ENUMERATE ID = xxxx<br>0101 xxxx$_b$: PDA SELECT ID = xxxx<br>ALL OTHERS: RESERVED |

FIG. 6

ENUMERATED PER DEVICE ADDRESSABILITY FOR MEMORY SUBSYSTEMS

PRIORITY

The present patent application is a nonprovisional application based on, and which claims priority to, U.S. Provisional Patent Application No. 62/509,353, filed May 22, 2017. The provisional application is hereby incorporated by reference.

FIELD

Descriptions are generally related to computer memory systems, and more particular descriptions are related to addressing specific devices of a group for individual configuration.

BACKGROUND

As memory interface frequencies increase, the margining of input/output (I/O) signaling is stricter, as even small variances can cause I/O errors. Recent generations of memory systems have begun to provide for individual configuration settings for memory devices that are part of a group (e.g., programming individual DRAM (dynamic random access memory) devices in a DIMM (dual inline memory module)). The individual configuration allows for different configuration settings for different memory devices to ensure reliable operation. Traditional training has used the data bus to program the individual configurations. When setting the configuration for each device separately is performed in the training of the I/O interface, the writing of configuration settings can introduce errors because the data bus timings have not been trained. Thus, writing individual configurations has traditionally required the use of an untrained interface, which makes the interface particularly susceptible to errors during the training flow.

One way to accommodate for potential errors is to extend the amount of time spent training each device to ensure that proper signaling occurs during training to provide the configuration settings for normal operation. However, extending the amount of time spent training a device extends the overall time of the training and setup, which can result in a training period that degrades performance of the system, especially as the number of devices increases and the amount of configuration applied to each device increases.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 2 is a representation of an example of settings for per device addressability.

FIG. 5 is a representation of an example of application of a per device addressability enumeration programming.

FIG. 6 is a representation of an example of a table to provide per device addressability commands via a register command instead of use of a data signal line.

Descriptions of certain details and implementations follow, including non-limiting descriptions of the figures, which may depict some or all examples, and well as other potential implementations.

DETAILED DESCRIPTION

As described herein, a memory subsystem provides PDA (per device addressability or per DRAM (dynamic random access memory) addressability) with device selection through the command and address (C/A) bus. Device selection via the C/A bus can improve the speed of PDA operations as compared to traditional approaches that provide device selection only through the data bus. The system provides enumeration of the devices with an address, which can then be used in a command to trigger PDA operations. PDA operation can target configuration commands to one of multiple devices that share a select line. PDA as described herein can apply to a per memory device addressability operation, or to a per buffer device addressability operation, or a combination. From one interpretation, reference to a memory device with reference to PDA can refer to either a memory device or to a buffer device.

The system includes a host and multiple addressable devices that can be coupled over a command bus and a data bus. The devices include a configuration or mode register to store a value to indicate whether PDA enumeration is enabled. When enabled, the host can provide an enumeration identifier (ID) command via the command bus with a signal via the data bus to assign an enumeration ID. In one example, the enumeration ID is assigned through the use of fuses, strap pins, read-only memory (ROM), or other mechanism to set the enumeration ID after the memory or buffer is incorporated into the system. After assignment of the enumeration ID, the host can send PDA commands via the command bus with the enumeration ID, without a signal on the data bus. Devices only process PDA commands that match their assigned enumeration ID, enabling the setting of device-specific configuration settings without needing to use the data bus on every PDA command.

Figure 1A:
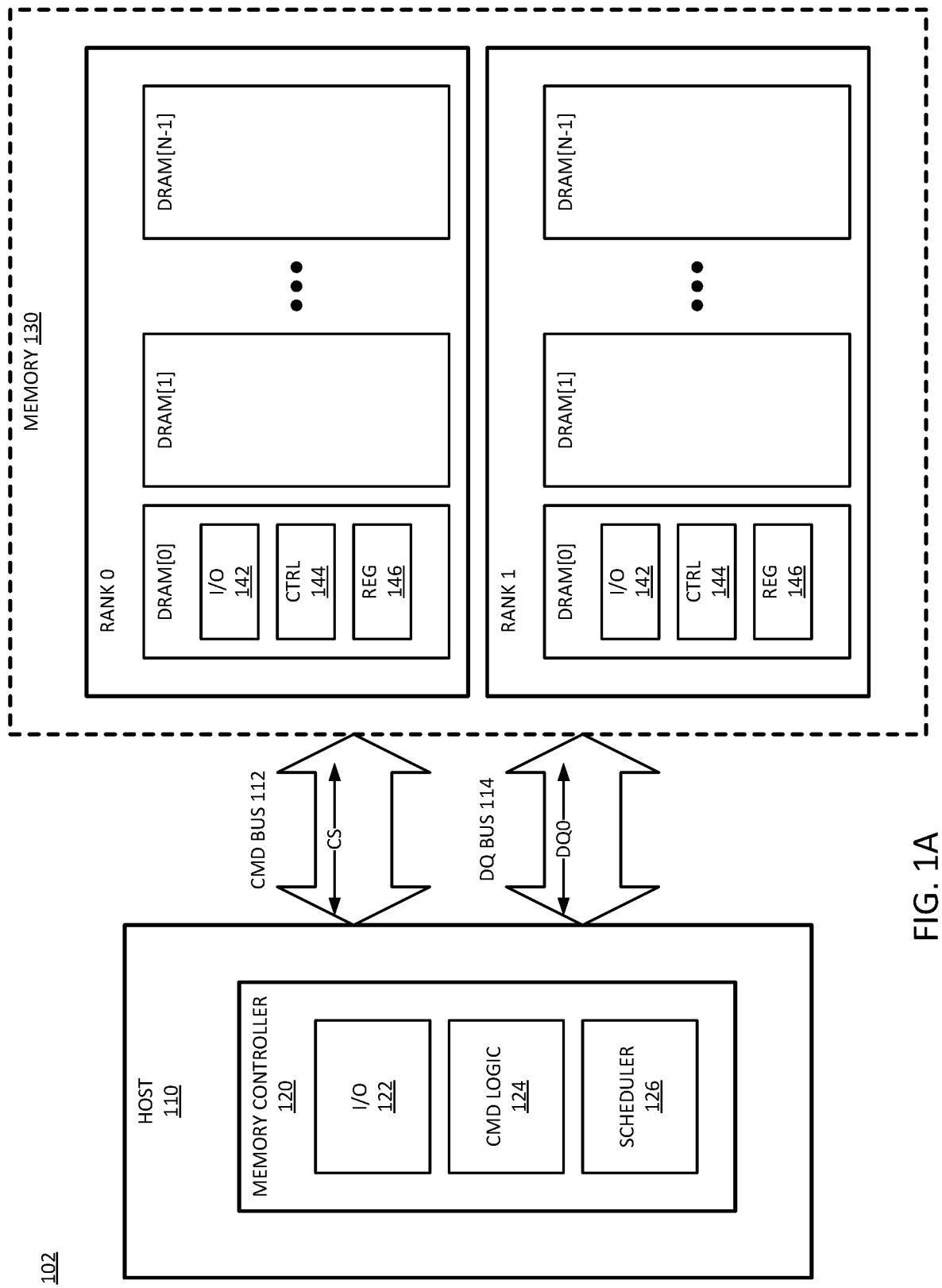
FIG. 1A is a block diagram of an example of a memory subsystem in which per device addressability can be implemented.

FIG. 1A is a block diagram of an example of a memory subsystem in which per device addressability can be implemented. System 100 represents elements of a computing system. System 100 can be considered to have a memory subsystem with memory controller 120 and memory 130. Host 110 represents the hardware platform that controls the memory subsystem. Host 110 includes one or more processors (e.g., a central processing unit (CPU) or a graphics processing unit (GPU) that generate requests for data stored in memory 130.

Host 110 includes memory controller 120, which can be integrated onto a processor device. Memory controller 120 includes I/O (input/output) 122 to connect to memory 130. I/O includes connectors, signal lines, drivers, and other hardware to interconnect the memory devices to host 110. I/O 122 can include command I/O as represented by command (CMD) bus 112, and data I/O as represented by DQ (data) bus 114. CMD bus 112 includes command signal lines. The command signal lines enable memory controller 120 to send commands to memory 130. The command signal lines include a CS (chip select) signal line. While illustrated as a chip select line, in one example, the chip select can be another type of device select. DQ bus 114 includes multiple data signal lines, including a DQ[0] or DQ0 signal line. For an N-bit interface, DQ bus 114 will include DQ[0:N-1]. DQ0 can be considered the first or least significant bit (LSB) of the data bus, and will thus be present in all DQ interfaces. Traditional PDA operation requires the use of DQ0 prior to training the DQ signal lines.

Memory controller 120 includes command (CMD) logic 124 to generate commands for memory. The commands can be commands for data access (such as Read, Write, Refresh, or other commands), or commands for configuration (such as mode register commands). Memory controller 120 includes scheduler 126 to schedule when to send commands in a sequence of operations. Scheduler 126 can control the timing for I/O in accordance with known timing to improve the chance that I/O will be error free. The timing is set through training.

Memory 130 can include individual memory devices, or can represent a memory module. System 100 illustrates two ranks of memory devices in memory 130. A rank refers to a collection of memory devices that share a select line. Thus, memory devices in a rank will execute operations in parallel. Rank[0] and Rank[1] are illustrated to include N DRAM (dynamic random access memory) devices or DRAMs. Typically a system with multiple ranks will have the same number of DRAMs in each of the ranks.

DRAM[0] of Rank[0] and DRAM[0] of Rank[1] are shown to include I/O 142, control (CTRL) 144, and register (REG) 146. Such components will be understood to be included in the other DRAMs as well. I/O 142 represents connection hardware comparable to I/O 122 of memory controller 120. I/O 142 enables connection of DRAMs to memory controller 120. Control logic 144 represents control components within the DRAM to decode and execute the commands and access operations. Control 144 causes the DRAM to perform the operations needed to execute the access initiated by memory controller 120. Register 146 represents one or more registers within the DRAM. Register 146 can include one or more configuration registers such as mode registers. Register 146 can store configuration information and information that determines a mode of operation by the DRAM in response to signals on command and data signal lines.

In one example, memory controller 120 can set or reset a bit of register 146 of a given DRAM to control whether the DRAM is in per-device addressability (PDA) enumeration mode. PDA enumeration can refer to a mode where memory controller 120 sets an enumeration identifier (ID) for the DRAMs that can be used for PDA without use of DQ bus 114. As indicated previously, traditional PDA operation requires the use of DQ bus 114. In one example, when memory controller 120 sets a DRAM for PDA enumeration ID operation, the memory controller can assign the enumeration ID with a combination of command on command bus 112, and the assertion of a signal on DQ bus 114. For example, memory controller 120 can place Rank[0] in enumeration ID mode by writing a command to registers 146 for all DRAMs in the rank.

To separately assign a unique ID to each DRAM, memory controller 120 can send an enumeration ID command identifying the ID, in conjunction with asserting (either with logic high or logic low on the signal line) a signal line of DQ bus 114 (such as DQ0). It will be understood that DQ bus 114 is typically multiple device interfaces in parallel, where DRAM[0] may be assigned DQ signal lines DQ[3:0], and DRAM[1] is assigned DQ [7:4], and so forth. DQ0 for DRAM[0] is DQ0 for DQ bus 114, and DQ0 for DRAM[1] is DQ4 for DQ bus 114. Different signal lines will be used in different configurations such as swizzling the signal line assignments, or using devices with different interfaces (e.g., using x8 devices instead of x4 devices), or other differences in implementation.

In one example, after memory controller 120 sets enumeration IDs for the DRAMs with enumeration ID commands, the memory controller can send PDA command based on the enumeration ID, without having to use the DQ bus. For example, memory controller 120 can send a PDA command that includes the enumeration ID of the target DRAM on the command bus, and can thus identify the target device for PDA operation without having to signal on the untrained DQ bus. The DRAMs receive the PDA commands, and can selectively choose which commands to execute and which to ignore. In one example, the DRAMs ignore all PDA commands that do not include an ID that matches an assigned enumeration ID. For example, if one of the DRAM devices is assigned an enumeration ID of 0010b, a PDA command with an accompanying enumeration ID of 0011b will be ignored by the DRAM device with ID=0010b. Thus, memory controller 120 can assign enumeration IDs, and then determine what commands to send to what devices, and what order to send configuration information to the DRAMs.

In one example, memory controller 120 issues multipurpose commands (MPCs) to execute PDA operations. An MPC command can be assigned to trigger enumeration ID, or trigger an enumeration ID mode, and thus to set IDs use for PDA operation. Other MPC commands can be assigned to trigger PDA operation based on the inclusion of enumeration ID information. In one example, memory controller 120 utilizes PDA commands to set device-specific programming of an on-die termination (ODT) parameter for a DRAM. The ODT can be ODT for the I/O hardware to interface with command bus 112 (i.e., CMD bus termination) or ODT for the I/O hardware to interface with data bus 114 (i.e., DQ bus termination). In one example, an MPC can trigger a PDA command to set device-specific programming of a differential feedback equalization (DFE) parameter for the DQ hardware interface. In one example, an MPC can trigger a PDA command to set device-specific programming of an I/O parameter. The I/O parameter can be a parameter to provide a setting for a program voltage, a read voltage, an access current, a timing parameter for an electrical characteristic or for data exchange signaling, or another I/O parameter, or a combination of these. The I/O parameters can be for the hardware interface to the data bus. In one example, I/O parameters can be set for the hardware interface to the command bus.

PDA operations enable the setting of individual configurations on a device-by-device basis. With increasing memory interface frequencies, allowing different configuration settings for different devices can ensure reliable operation, as each device can apply settings that provide the best I/O (input/output) operation. The PDA operations described herein can enable configuration settings such as voltage levels for different conditions, termination settings in different modes, phase and timing settings to manage the data eye, slew rates, and other settings that are trained for a specific device to improve its I/O. With PDA enumeration, the PDA operations can be limited to the use of the command bus after initialization including assigning the IDs, which can significantly reduce the time needed for PDA operations as compared to PDA operations that require the use of the data bus.

PDA has traditionally been applied as a specific mode, where the host configures a group of memory devices for PDA mode, and then issues commands to set configuration for specific devices based on a signal on the data bus. As such, the data bus effectively operates as a PDA command enable signal for traditional PDA. For PDA operations to function, the memory controller or host needs to be able to separately address the memory devices, and when command lines and the whole C/A bus are shared among the memory devices, the memory controller needs a mechanism to identify a specific device. Because data bus signal lines are individual to different memory devices, such signal lines can be used. The alternative of adding signal lines to select the device results in a higher signal line count, which increases costs.

The use of the data bus as a device selection or PDA enable works when the number of configuration settings is small. However, the number of specific configurations continues to rise with increasing interface speeds. Emerging memory devices are proposed to include dozens of configuration registers (e.g., mode registers) that should be set with individual configuration settings, resulting in dozens of PDA commands needing to be executed. For example, DFE configurations can require enough data to fill dozens of mode registers.

It will be understood that a primary use of PDA is to individually configure the I/O settings of memory devices, which includes configuration settings set in response to training the I/O interface. With small margins for error in the I/O, pre-trained communication has a much higher likelihood of error than a trained interface. Prior to completion of training of the data bus on a DIMM (dual inline memory module), there are many cases where a command must be sent to specifically program configuration registers for specific memory devices or buffer devices. With an untrained data bus, the communication exchange must occur with an assumption of specific timings associated with the data (DQ) signaling. However, the assumptions can lead to unreliability of the training, which further extends the timing of the programming, as the device may attempt to program certain registers multiple times before success. Some configurations require changes to the frequency, which requires additional time for training. It will be understood that the use of assumed timing parameters puts an additional constraint of coordinating the DQ pattern with the configuration commands.

The described PDA operation without the use of a non-C/A signal line (e.g., such as a data bus signal line or a dedicated select line) can improve the speed and reliability of training. In one example, the system assigns a unique PDA enumerate ID (identifier) for every memory device or buffer device, or a combination. In one example, the setting of the enumerate ID occurs in preparation for PDA operation, and includes the use of a data bus signal line to set the enumeration ID. After setting the enumerate ID, or if the devices are otherwise preconfigured with an enumerate ID, the host can perform PDA operation only through the C/A bus by designating commands with an identifier. Thus, subsequent PDA commands do not require the use of the DQ signals to designate which device is selected for the command. The devices can receive the command and determine if their configured ID (the enumerate ID) matches the ID identified for the command (the select ID). If the IDs match, the device will execute the command, and will otherwise ignore it.

Figure 1B:
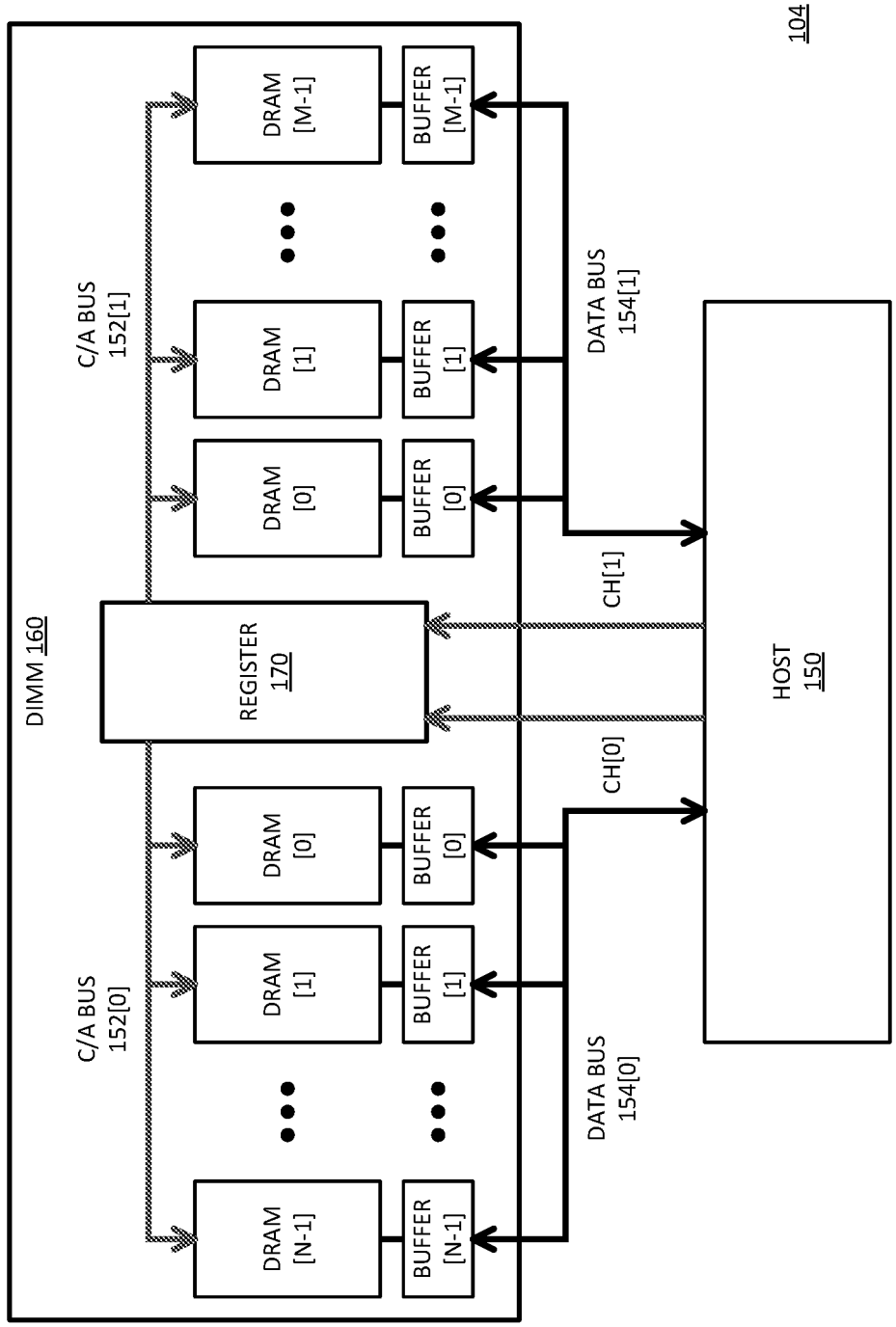
FIG. 1B is a block diagram of an example of a DIMM in which per device addressability can be implemented for memory devices or buffer devices or both.

FIG. 1B is a block diagram of an example of a DIMM in which per device addressability can be implemented for memory devices or buffer devices or both. System 104 provides one example of a DIMM system in accordance with memory 130 of system 102 of FIG. 1A. DIMM 160 is a memory module that includes multiple memory devices. System 104 can alternatively be implemented as a multi-device or multichip memory package, such as with stacked DRAMs and control logic that operates as register 170.

In one example, system 104 applies PDA to set device configuration for specific DRAM devices. In one example, system 104 applies PDA to set device configuration for specific buffers. In one example, system 104 applies PDA to set device configuration for specific DRAM devices and for specific buffers. The application of PDA in system 104 is through a command bus without needing to drive signals on the data bus. The buffers are optional, and implementations of DIMM 160 can exclude the buffers.

System 104 includes DIMM 160 with two channels of DRAM devices. Channel 0 (CH[0]) includes N DRAM devices, DRAM[0:N-1], and Channel 1 (CH[1]) includes M DRAM device, DRAM[0:M-1]. In one example, N=M. Depending on the system configuration, the DRAMs can have x4 data bus interfaces, x8 data bus interfaces, x16 data bus interfaces, or some other interface. Since the data interfaces between the DRAMs and host 150 are buffered, DIMM 160 can be considered to have N buffers for CH[0], and M buffers for CH[1], to match the respective number of DRAMs. In one example, the number of physical buffer devices is fewer than the number of DRAM devices, and one buffer chip will buffer the data signal lines for more than one DRAM device.

System 104 includes bidirectional data buses 154, with data bus 154[0] for CH[0], and data bus 154[1] for CH[1]. Data buses 154 provide for the exchange of data between the DRAMs and host 150. To access the data and to manage the DRAMs, system 104 includes unidirectional C/A or CMD buses 152, with C/A bus 152[0] for CH[0], and C/A bus 152[1] for CH[1]. Buses 152 can be considered unilateral multi-drop buses. Typically the configuration is in a fly-by topology. Host 150 provides a command to either CH[0] or CH[1] over a desired C/A bus, which goes through register 170 on DIMM 160. Register 170 forwards the commands to the DRAMs over C/A buses 152.

Register 170 represents a controller for system 104, or a controller for the memory module or DIMM 160. It will be understood that the controller represented by register 170 is different from a host controller or memory controller (not specifically shown) of host 150 or of a computing device in which system 104 is incorporated. Likewise, the controller of register 170 is different from an on-chip or on-die controller that is included on the DRAM devices. In one example, register 170 is an RCD (registered clock driver, which can also be referred to as a registering clock driver). The RCD receives information from host 150. Host 150 can be or include a memory controller. Register 170 buffers the signals from host 150 to the various DRAMs, and controls the timing and signaling to the DRAMs. In one example, register 170 is a controller on DIMM 160 to control signaling to the various memory devices.

While not specifically shown, host 150 includes I/O or interface hardware to couple to the components of DIMM 160, including the DRAMs, and the buffers if there are buffers. Additionally, register 170 and the DRAMs include I/O or interface hardware to couple to respective C/A buses. The DRAMs include hardware interfaces to couple to the data buses in addition to the command buses. In one example, the DRAMs couple to the data buses through the buffers. The buffers include I/O or interface hardware to couple to the DRAMs and to the data buses.

In one example, the buffers can be individually addressed to set specific configuration for the hardware interfaces. In one example, the buffers are separately addressable from the DRAMs. Thus, PDA enumeration can be used to assign an enumeration ID to the DRAMs, and can be used to assign an enumeration ID to the buffers. Thus, the buffers can have an enumeration mode the same as the DRAMs.

The PDA operations based on enumeration ID can be referred to as C/A based PDA device selection, which can eliminate the need for precise timings on the DQ bus prior to executing per device settings. Additionally, the C/A based PDA device selection can improve the efficiency of executing a longer sequence of many PDA operations, such as MRW (mode register write) commands, since the DQ patterns do not need to be coordinated with the commands. In one example, the C/A based PDA device selection enables the ability of register 170 on a registered DIMM 160 to program PDA commands associated with initialization and training, which can offload the training from the host to the register device. Traditionally, the register has no access to the DQ signals, and would traditionally be unable to perform the training.

In accordance with what is described herein, in one example, host 150 configures the PDA enumerate IDs for the DRAMs, and then register 170 sets one or more configuration settings based on a PDA select ID and configuration operations. In one example, PDA enumerate IDs are assigned on a per-rank basis. In one example, a C/A based PDA operation can be used to program different ODT (on-die termination) or Vref (voltage reference) values on DRAM devices on a given rank. Some device-specific settings are programmed prior to any training of the C/A signal timings, or CS (chip select) timings, or DQ write timings, or a combination. In one example, a system that applies C/A based PDA operation can use MPC (multipurpose) and timings for VrefCA commands (voltage reference for the command bus, as Vref can refer to a voltage reference for the data bus). The VrefCA commands can have extended setup/hold and multicycle CS assertion for PDA commands if the C/A and CS timings have not yet been trained.

FIG. 2 is a representation of an example of settings for per device addressability. The table view represents a register 200 that can illustrate mode register fields related to PDA operations. Register 200 can be an address on a memory device in a system in accordance with system 100, which performs PDA operation based on an ID in the PDA command. MR Address represents a mode register address, which is designated as a mode register (MR and the variable indicating which mode register) and a starting address within the register (A and the variable).

Row 210 illustrates an address $Mx_1Ay_1$, which represents mode register number x1 at location y1 within the mode register. Row 220 illustrates an address $Mx_2Ay_2$, which represents mode register number x2 at location y2 within the mode register. Row 230 illustrates an address $Mx_3Ay_3$, which represents mode register number x3 at location y3 within the mode register.

In one example, row 210 illustrates an address to store bits that control an operating mode of PDA enumerate programming mode. Thus, row 210 represents an address with a field (of one or more bits) to control PDA enumerate programming mode. In one example, a 0 disables the mode and a 1 enables the mode. The field to trigger the mode can be a read only mode register field that is programmed via an MPC command. The host determines when to enable the enumerate programming mode. The PDA enumerate programming mode enables setting unique IDs for the devices. The PDA enumerate programming mode can be similar to traditional PDA mode, and send a command on the command bus with a signal on one or more data bus signal lines. In one example, the mode register value is read only with respect to mode register set (MRS) commands, and can only be programmed through an MPC command. In one example, the value can be read with a MRR command but not written with a MRW command. In one example, the value can be written with a MRW command.

In one example, row 220 illustrates an address to store bits that indicate a PDA enumerate ID. Thus, row 220 represents an address with a field (of one or more bits) to store a PDA enumerate ID. In one example, the enumerate ID is read only with respect to MRS commands, and can only be programmed through an MPC command. In one example, the value can be read with a MRR command but not written with a MRW command. In one example, the value can be written with a MRW command. In one example, the value includes four bits as a binary encoding of a PDA enumerate ID. The MPC commands for the PDA operation can default to sending a 1111$b$, which can be a mask value to select all devices. In one example, the memory device reads the enumerate ID value upon receipt of an MPC command to verify whether the enumerate ID matches an ID in the MPC opcode. The unique ID can provide a mechanism to identify a specific device without use of a DQ bus.

In one example, row 230 illustrates an address to store bits that indicate a PDA select ID. Thus, row 230 represents an address with a field (of one or more bits) to store a PDA select ID. In one example, the select ID is read only with respect to MRS commands, and can only be programmed through an MPC command. In one example, the value can be read with a MRR command but not written with a MRW command. In one example, the value can be written with a MRW command. In one example, the value includes four bits as a binary encoding of a PDA select ID. The MPC commands for the PDA operation can default to sending a 1111$b$, which can be a mask value to select all devices. In one example, a default setting is for broadcast to all devices. In one example, host writes the value to the mode register with an MPC command to indicate an ID of a device that should execute the MPC command. Only the device with the identified ID will process and execute the command.

In one example, a configuration command, such as through an MPC command, can be broadcast to all devices by sending a preset ID (e.g., 1111b). The broadcast ID effectively turns off the PDA mode for that command without having to switch in and out of PDA mode. Sending a command with a specific ID again triggers the PDA mode. In one example, because the PDA select ID can be written to a mode register, the selection can be "sticky," and the ID needs to be written only once for a sequence of commands. For example, if the host is to write multiple configuration settings to the same device, the host can write the PDA select ID to all devices, and then send a command for execution by the selected device. For a subsequent command to the same selected device, in one example the host does not need to rewrite the PDA select ID, and only the device with the matching enumerate ID of the previous command will execute the subsequent commands.

Figure 3:
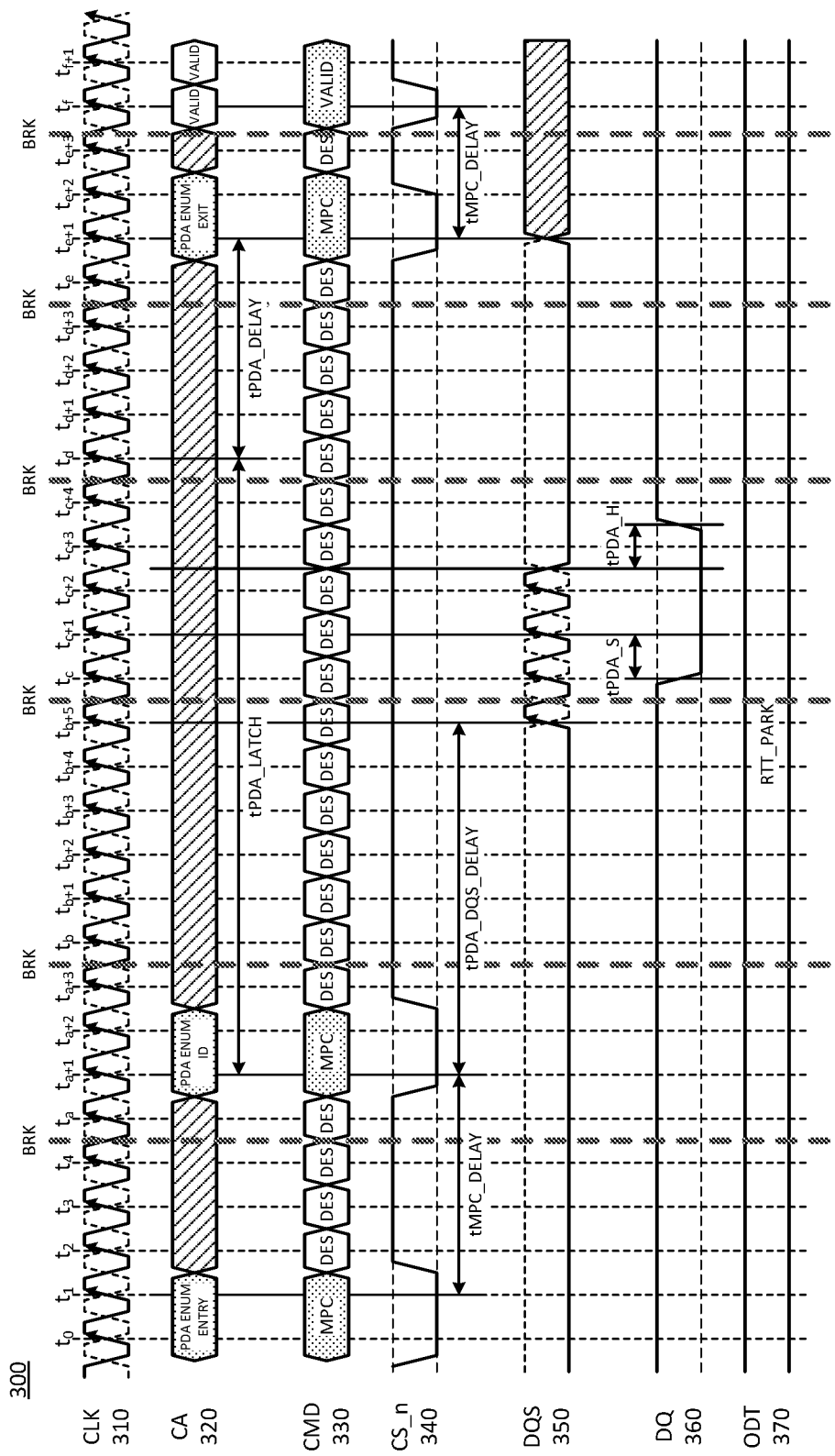
FIG. 3 is a timing diagram of an example of timing of per device addressability enumeration.

FIG. 3 is a timing diagram of an example of timing of per device addressability enumeration. Diagram 300 represents a timing diagram for PDA enumerate programming. Diagram 300 provides an example of PDA enumeration operation for a system in accordance with system 100. Diagram 300 represents multiple interconnections between a host or memory controller and the associated memory devices. The interconnection is provided through one or more signal lines to trigger the states or signals depicted. The labeled signals may represent the state within the memory device. The state can be in response to a signal line, such as the clock signal lines, the data strobe signal lines. The state can be in response to multiple signal lines such as the command/address, and the data signals. The state can represent an internal state of operation of the memory device such as the command signal and the termination signal.

CLK 310 represents a clock for the system, and both the clock (CK_t) and the complement (CK_c) are illustrated. For the example of diagram 300, the clock is the solid line signal with the arrows to indicate a rising edge. The complement is illustrated as a dashed line. CA 320 represents a command/address signal sent on C/A signal lines, and indicates a command encoding as provided by the host. CMD 330 represents a decoding of the command encoding, and can thus represent a signal that represents internal operations generated by the controller within the memory device. CS_n 340 represents chip select or device selection. In one example, there are multiple chip select signal lines. In a system that uses ranks, multiple memory devices share a chip select signal line and are triggered in parallel. For purposes of diagram 300, CS_n 340 represents the signal as received for a memory device to be selected for access; it will be understood that the command signals can be received by another memory device coupled in parallel that will not be triggered with the chip select signal, and will thus ignore the commands.

DQS 350 represents a data strobe signal that is send with and provides timing for DQ 360. DQ 360 represents the data sent on the data bus. The device that drives data on DQ 360 typically generates the DQS signal (i.e., the memory controller for Write, and the memory device for Read). DQS 350 is not necessarily aligned to CLK 310. ODT 370 represents a state of termination for the memory device during the access operations. ODT 370 represents termination of the data bus, and termination of the command signal lines is not contemplated in diagram 300. The heavy dashed lines represent timing breaks (BRK). The vertical dashed lines indicate a clock cycle as indicated by the CK_t rising edge, and the clock cycles are illustrated at the top, and reset at each break, incremented by a new variable. For example, the clock cycle after $t_{a+3}$ is $t_b$. In a double data rate system, there are two transfer periods or unit intervals (UIs) per clock cycle. Some commands take two UIs.

The PDA enumerate programming entry (PDA ENUM Entry) in the CA signals of CA 320 corresponds to an MPC on CMD 330 that includes an opcode to set the PDA enumerate programming mode. After a time period of tMPC_DELAY, the host sends the PDA enumerate ID (PDA ENUM ID) on CA 320 in a subsequent MPC opcode indicated in CMD 330. The period tMPC_DELAY represents a delay period after an MPC command. In one example, ODT 370 represents an ODT value of RTT_PARK being applied for the PDA enumeration operation.

In one example, after a period of tPDA_DQS_DELAY, the host can drive a data clock or synchronization strobe signal as illustrated on DQS 350. The period tPDA_DQS_DELAY can refer to a delay from the MPC command to a rising strobe edge sent by the host and used by the memory device to sample the DQ signal line during PDA operation. After initiating the DQS signal, the can drive or asserts a signal on DQ 360. In one example, the range permitted for tPDA_DQS_DELAY specifies the full range of when a minimum of strobe edges equal to a full burst length can be sent by the host controller. For example, for an implementation where BL-16, tPDA_DQS_DELAY can be long enough to ensure 16 strobe edges or transfer cycles, or 8 clock cycles pass before initiating the strobe.

For purposes of diagram 300, the signal for DQ 360 can represent any of multiple signal lines of the DQ bus used to indicate a specific memory device. For example, the signal can be driven on DQ0 for the selected memory device, which may be DQ0, DQ4, DQ8, DQ12, or so forth, of the data bus. The signal can allow the PDA enumeration to select an individual memory device. Diagram 300 illustrates two delay parameters, tPDA_S and tPDA_H associated with the asserted signal on DQ 360. tPDA_S can refer to a PDA setup time for the DQ signal during PDA operation, and tPDA_H can refer to a PDA hold time for completing the transfer.

The time tPDA_Latch represents a timing for latching the PDA enumerate ID. The time can represent a delay from the PDA command in CA 320 to when the memory device can latch the DQ assertion feedback, and goes from the PDA ENUM ID command to a time after the memory device is identified by the signal on DQ 360. The memory device can then store the ID provided in the enumeration ID command into a register, such as a mode register, for use with subsequent PDA commands. An example of subsequent PDA signaling is provided with respect to FIG. 4. In one example, the time tPDA_LATCH can be calculated as a worst case cycle delay that indicates the latest time the strobe burst will be completed for DQ assertion, or the signaling on the DQ signal line. In one example the value is an equation based on tPDA_DQS_DELAY.

In one example, the host triggers the exit from PDA programming mode on a scheduled time after the latching of the enumerate ID. In one example, the host waits tPDA_DELAY after tPDA_LATCH to send the MPC opcode to exit PDA enumerate programming mode (PDA ENUM Exit). The period tPDA_DELAY can refer to a time after latching the PDA enumerate ID until any subsequent command. In one example, the host waits tMPC_DELAY after exiting PDA enumerate programming mode until sending a valid command, such as a configuration command with a PDA select ID.

It will be understood that diagram 300 illustrates one example of how to program the enumerate ID by use of the DQ signal line or another non-CA signal line. Other programming methods could be used. After programming the PDA enumerate ID, only C/A signal lines are needed to perform configuration programming.

It will be understood that for simplicity only the programming of a single device is illustrated in diagram 300. However, all devices can enter the PDA enumerate programming mode at the same time, and the ID can be set for multiple different devices prior to exiting the mode. The mode could be extended by the use of different DQ signal lines for specific devices until the desired devices have an enumerate ID programmed. After programming multiple devices, the host can exit the PDA enumerate programming mode.

In general with respect to PDA enumerate for PDA operation, the host can perform PDA operation as follows. In one example, the host enables the PDA enumerate programming mode by sending one or more MPC command cycles with an opcode to trigger PDA enumerate programming mode. In one example, in the PDA enumerate programming mode, only the MPC command with PDA enumerate ID opcodes is qualified with DQ0 for x4 and x8, and DQL0 for x16. DQ0 can be used as the device selection on the DQ bus. DQL0 refers to the lower byte for a device with a x16 interface, but DQU0 or a different signal line could alternatively be used. In one example, MRW, MPC, or VrefCA commands can be used in the PDA programming mode, and are qualified with the data bus signal line. For simplicity in the description below, only MPC commands are referenced, but will be understood as merely an example. For a device that does not receive the qualification on the data bus signal line (such as DQ0), the device ignores the command.

The programmed device can capture DQ0 or the other DQ signal line DQS_c and DQS_t (or, for example, DQSL_c and DQSL_t for x16 signals) as illustrated. In one example, if the value on the DQ signal line is 0, the device executes the MPC command to set the PDA enumerate ID. In one example, if the value on the DQ signal line is 1, the device ignores the MPC command. In one example, the host drives more than one DQ signal line for the target device, or drives all DQ bits for the DQ signal lines of the target device. In one example, only the MPC command with PDA enumerate ID opcodes will be supported in PDA enumerate programming mode, and the MPC command to exit PDA enumerate programming mode does not require a DQ qualification.

In one example, the controller sends a complete BL16 set of strobe edges (e.g., 8 rising edges and 8 falling edges) within the tPDA_DQS_DELAY min/max range after the MPC command. In one example, the device samples the signal line to capture the DQ value during the last 4 strobe edges. In one example, if the device captures a 0 on the DQ signal line at any of the last 4 strobe edges in the strobe sequence, the device executes the PDA enumerate ID command. During PDA programming mode, the write timings for the DQ bus may not have been trained, and the host may be required to ensure a minimum of 16 strobe edges occurs after a period of tPDA_DQS_Delay (min) after the associated MPC command. The time when the device latches the DQ assertion value is tPDA_LATCH, which delay accounts for the latest timing of the DQ assertion from the host and is based on tPDA_DQS_DELAY (max). In one example, the device will ignore a BC8 (burst chop 8, or use of 8 UIs instead of the normal 16) mode register setting while in PDA enumerate programming mode. In one example, the range of tPDA_DQS_DELAY specifies the full range of when the minimum of 16 strobe edges can be sent by the host controller.

In one example, prior to when the host sends the MPC command for PDA enumerate programming mode entry, the host drives DQS_t and DQS_c differentially low, other than when sending a burst of 16 strobe edges in association with the PDA enumerate ID MPC command. The host may additionally send preamble and postamble DQS_t/DQS_c toggles during the qualification of the PDA command. Once PDA enumerate programming mode is enabled in the device, the host memory controller can wait tMPC_DELAY to the time the first PDA enumerate ID MPC command is issued.

In one example, the host programs the desired devices and mode registers or configuration settings using MRW, MPC, or VRefCA commands and the data bus signal line. The host controller can program all DQs per device to ensure that the DQ signal line (such as DQ0, or a different signal line other than DQ0) is programmed correctly when considering the possibility of bit swizzling on the a board or DIMM.

In one example, In the PDA enumerate programming mode, only PDA enumerate ID MPC commands and exit PDA enumerate programming mode MPC commands are allowed. Alternatively, only MPC, MRW, and VrefCA commands are allowed. In one example, the memory device applies a default impedance of RTT_PARK to the DQ signals in the PDA enumerate programming mode, or another default or last-applied impedance. In one example, a mode register write command cycle time in PDA mode, tPDA_DELAY, is required to complete the write operation to the PDA enumerate ID mode register and is the minimum time required after the DQ assertion is latched (after tPDA_LATCH), prior to the next PDA enumerate ID MPC command. In one example, tPDA_LATCH is a worst case cycle delay that indicates the latest time the strobe burst will be completed for the DQ assertion. The value may be an equation based on tPDA_DQS_DELAY. In one example, the host removes the device from PDA enumerate programming mode by sending an MPC command with an opcode that causes an exit. In one example, the exit PDA enumerate programming mode MPC command is never qualified by the DQ settings and is applied to all DRAMs in a rank.

In one example, only a subset of MPC commands may be qualified by PDA mode, such as CA ODT, CS ODT, and CK ODT settings. The host does not send MPC commands that are not supported while the DRAM is in PDA mode.

The following sequence provides one example of a sequence to program the PDA enumerate ID per device for a number MAX_DRAMs of devices:

1. Send MPC command with 'Enter PDA Enumerate Programming Mode' opcode;
2. For (i=0, i<MAX_DRAMs, i++)
    a. Send PDA Enumerate ID with i in the opcode (4-bit value), with device i's DQ signals low;
3. Send MPC with 'Exit PDA Enumerate Programming Mode' opcode.

Diagram 300 illustrates one of multiple ways in which enumeration can be performed. In diagram 300, enumeration occurs via assertion of one or more signals on a DQ bus. In one example, enumeration can be performed via daisy-chaining signals, and each device in the chain can increment the value prior to recording the value or prior to sending the value down the chain. In one example, the devices can be programmed with an enumerate ID through the use of strap pins. In one example, the devices can be programmed through a sideband interface. In one example, the devices can be programmed during test and packaging.

Figure 4:
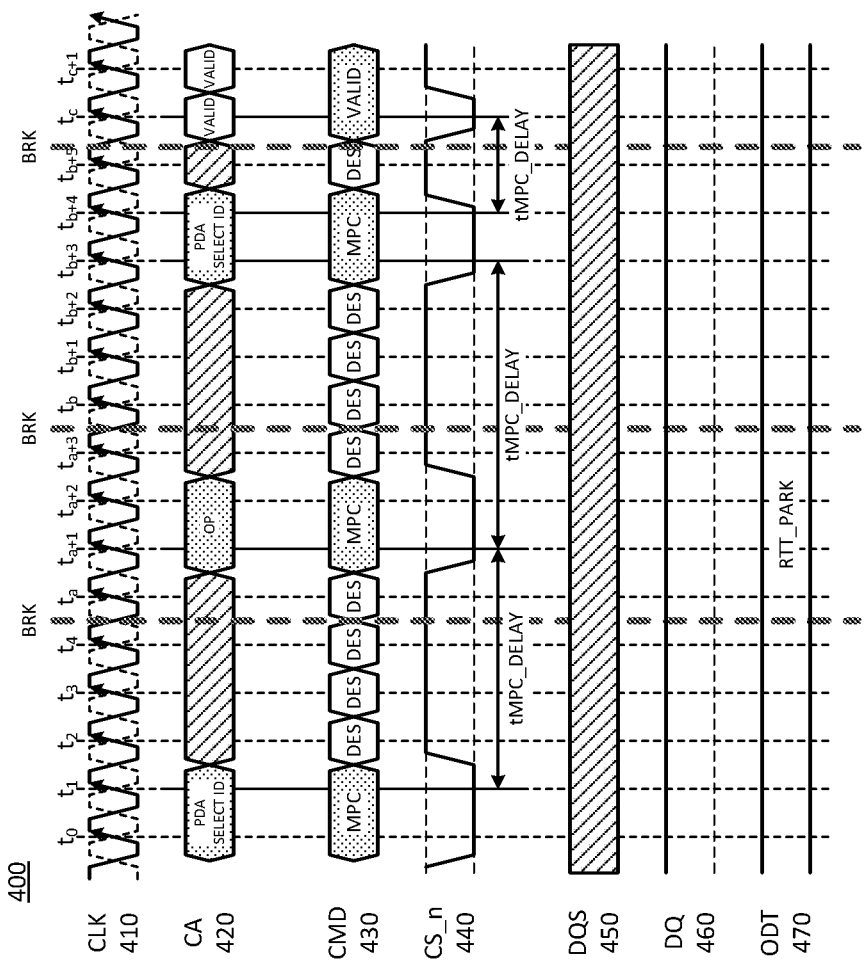
FIG. 4 is a timing diagram of an example of timing of per device addressability selection based on an identifier set during enumeration.

FIG. 4 is a timing diagram of an example of timing of per device addressability selection based on an identifier set during enumeration. Diagram 400 illustrates one example of MPC command sequencing with a PDA select ID. The sequencing could be used with MPC, VrefCA, MRW commands, or other configuration commands. Diagram 400 assumes that the devices to be selected have been programmed with PDA enumerate IDs, and can thus identify a command based on ID instead of using signaling outside the command bus (such as use of the DQ signal line).

The signals in diagram 400 can be the same or comparable to those described in diagram 300 of FIG. 3. The descriptions above for those signals applies equally to the signals of diagram 400. In one example, diagram 400 occurs directly after the operations of diagram 300. For example, the VALID signal shown in diagram 300 could be the PDA SELECT ID command illustrated in diagram 400. Diagram 400 illustrates a single operation as an example, but many such command operations could be performed in sequence in accordance with diagram 400. For example, the VALID command in diagram 400 could be a subsequent PDA SELECT ID.

CLK 410 represents a clock for the system, showing complementary clock signaling (both CK_t and CK_c). CA 420 represents a command/address signal. CMD 430 represents a decoding of the command encoding within the memory device. CS_n 440 represents chip select or device selection. DQS 450 represents a data strobe signal. DQ 460 represents the data bus signaling. ODT 470 represents a state of termination for the memory device during the PDA operations.

After programming the devices with PDA enumerate IDs, the execution of configuration commands depends on the value of the PDA select ID and the type of MPC command. The execution of the configuration commands does not depend on the DQ bus signals, but on the signaling on CA 420 and its corresponding decoded command on CMD 430. In one example, if the PDA select ID is set to 1111*b*, all devices will execute the command. In one example, for all MRW commands and VrefCA commands, and some of the MPC commands (RTT_CA/CS/CK and RTT_PARK opcodes), the device compares the PDA select ID to the PDA enumerate ID to determine if the device will execute the command. In such implementations, the device can execute all other MPC commands (referring to commands that are not the RTT_CA/CS/CK and RTT_PARK opcodes), regardless of the PDA select ID value.

CA 420 illustrates an operation OP to represent an opcode sent with an MPC command. In one example, for a specific select ID, and thus for a specific device, the host can send a sequence of multiple opcodes and configuration settings before sending another select ID to either trigger a different device or set the system to default by sending a broadcast signal, such as 1111*b*. In one example, there is a delay of tMPC_DELAY between each configuration command or MPC and opcode combination.

It will be observed that DQS 450 is in a "Don't Care" state for the entire operation illustrated in diagram 400, because no signals are send over DQ 460. Thus, it will also be observed that DQ 460 illustrates no change in the DQ signaling, because no signal is sent using the DQ signal lines. ODT 470 can remain in RTT_PARK, or whatever previously-set termination state has been applied to the device.

As an example, the following sequence could be used to program unique configurations by writing unique register fields per device:

A. For (i=0, i<MAX_DRAMs, i++);

1. Send MPC with 'PDA Select ID' opcode for device i (e.g., encoding 0000 included in the opcode to select first DRAM);

2. For (j=0, j<TOTAL_SETTINGs, j++);

a. Send PDA command for configuration (e.g., MRWs for field settings) specific to Device 0000, which can include one operation or multiple operations, to configure setting j;

b. Continue until the j reaches the TOTAL_SETTINGs to be configured for the device, which can be any number of MRW or configuration commands, and can be different numbers of commands for different devices;

3. Continue until i reaches MAX_DRAMs to configure all devices (for example, after device 0000, increment to include 0001 in the opcode to configure the second DRAM);

4. Send MPC with 'PDA Select ID' opcode, with encoding 1111 included in the opcode to enable all DRAMs to execute all MRW, VrefCA, and MPC commands.

Thus, in one example, the application of the PDA select ID can enable the selection of a specific device for a sequence of writes to apply various configuration settings.

FIG. 5 is a representation of an example of application of a per device addressability enumeration programming. Table 500 illustrates commands that can be used for configuration, and indicates whether or not to use a PDA select ID to determine whether to execute a received command. Table 500 can be used by a memory controller and memory device in a system in accordance with system 100 of Figure. In one example, there are MPC commands that do not use the PDA select ID to determine if the command will be applied. Thus, for receipt of these commands by a device, the device will execute the command without determining if the PDA select ID matches an enumerate ID for the device.

In row 502, in one example, the system utilizes the PDA select ID for all MRW command opcodes. In row 504, in one example, the system utilizes the PDA select ID for all VrefCA command opcodes. In row 506, in one example, the system utilizes the PDA select ID for MPC command opcodes for Set RTT_CA. In row 508, in one example, the system utilizes the PDA select ID for MPC command opcodes for Set RTT_CS. In row 510, in one example, the system utilizes the PDA select ID for MPC command opcodes for Set RTT_CK. In row 512, in one example, the system utilizes the PDA select ID for MPC command opcodes for Set RTT_PARK.

In row 514, in one example, the system does not utilize the PDA select ID for MPC command opcodes for Apply VrefCA and RTT_CA/CS/CK. In row 516, in one example, the system does not utilize the PDA select ID for MPC command opcodes for Enter PDA Enumerate Programming Mode, because that Mode is needed to set the select ID. In row 518, in one example, the system does not utilize the PDA select ID for MPC command opcodes for Exit PDA Enumerate Programming Mode, as the Mode used to set the PDA select ID is completed. In row 520, in one example, the system does not utilize the PDA select ID for MPC command opcodes for PDA Enumerate ID. In row 522, in one example, the system does not utilize the PDA select ID for MPC command opcodes for PDA Select ID. In row 524, in one example, the system does not utilize the PDA select ID for MPC command opcodes for all other MPC opcodes. In one example, the PDA Enumerate ID is the only command that utilizes the PDA Enumerate ID Programming mode.

In one example, the PDA enumerate ID includes a 4-bit field to set unique IDs for up to 16 devices. Correspondingly, the host will send out a 4-bit PDA select ID. It will be understood that more bits can be used for more IDs, and fewer bits can be used for fewer IDs. When the PDA select ID is the same as the PDA enumerate ID, the device is triggered to execute an MPC (multipurpose command), MRW (mode register write), or VrefCA (voltage reference for the command/address bus) command. In one example, one of the addresses is designated as a broadcast or All Device code. For example, consider a DDR system where 1111*b* is designated as an "All DRAM" code; when the host sends a command with the All DRAM code, all DRAM devices will execute the command.

It will be understood that the assignment of a PDA enumerate ID can be performed once as part of a permanent configuration of the device, or can be performed once for each initialization of the I/O of the memory subsystem. Even if the enumeration process leverages the DQ bus, it can do so without requiring precise timings, and can do so only for a brief time to program the enumerate IDs. Once the PDA enumerate ID is initialized, the host can target any particular device with a subsequent command with a PDA select ID. All commands after the PDA select ID is set, which can refer to many command types or only commands associated with configuration settings, would be processed only by the device whose PDA enumerate ID equals the PDA select ID.

FIG. 6 is a representation of an example of a table to provide per device addressability commands via a register command instead of use of a data signal line. Table 600 provides one example of opcode assignments for MPC operations. Table 600 can be used by a memory controller and memory device in a system in accordance with system 100 of Figure. The host triggers the MPC with an MPC command, and the data with the MPC command indicates what command is to be executed. In one example, the MPC command must be used to set the ID, since the MRW is a two UI command that is not always operational. Selected MPC command encodings can be as follows.

Operand '0000 0000b' can trigger exit from CS Training Mode. Operand '0000 0001b' can trigger entry into CS Training Mode. Operand '0000 0010b' can be reserved for future use (RFU). Operand '0000 0011b' can trigger entry into CA Training Mode.

Operand '0000 0100b' can trigger a ZQCaI Latch function. Operand '0000 0101b' can trigger a ZQCaI Start. Operand '0000 0110b' can trigger the device to stop the DQS Oscillator. Operand '0000 0111b' can trigger the device to start the DQS Oscillator.

Operand '0000 1xxxb' can trigger the device to Set RTT_CA=xxx, where the 'x' is a variable. Thus, the operand can include any of '0000 1000b', '0000 1001b', and so forth. Operand '0010 1xxxb' can trigger the device to Set RTT_CS=xxx, where the 'x' is a variable. Thus, the operand can include any of '0010 0000b', '0010 0001b', and so forth. Operand '0011 0xxxb' can trigger the device to Set RTT_CK=xxx, where the 'x' is a variable. Thus, the operand can include any of '0011 0000b', '00110001b', and so forth. Operand '0011 1xxxb' can trigger the device to set RTT_PARK=xxx, where the 'x' is a variable. Thus, the operand can include any of '0000 1000b', '0000 1001b', and so forth. In each of these, there can be a range of values used to set a configuration setting for a specific device.

Operand '0010 0000b; can trigger an exit from PDA Enumerate Programming Mode. Operand '0010 0001b' can trigger entry into PDA Enumerate Programming Mode. Operand '0010 0010b' can trigger the device to apply VrefCA and RTT_CA/CS/CK. Operand '0100 xxxxb' can trigger the device to set the PDA Enumerate ID=xxxx, where the 'x' is a variable. Thus, the operand can set the enumerate ID to any of '0000b', '0001b', and so forth. Operand '0101 xxxxb' can trigger the device to set the PDA Select ID=xxxx, where the 'x' is a variable. Thus, the operand can set the select ID to any of '0000b', '0001b', and so forth.

Figure 7:
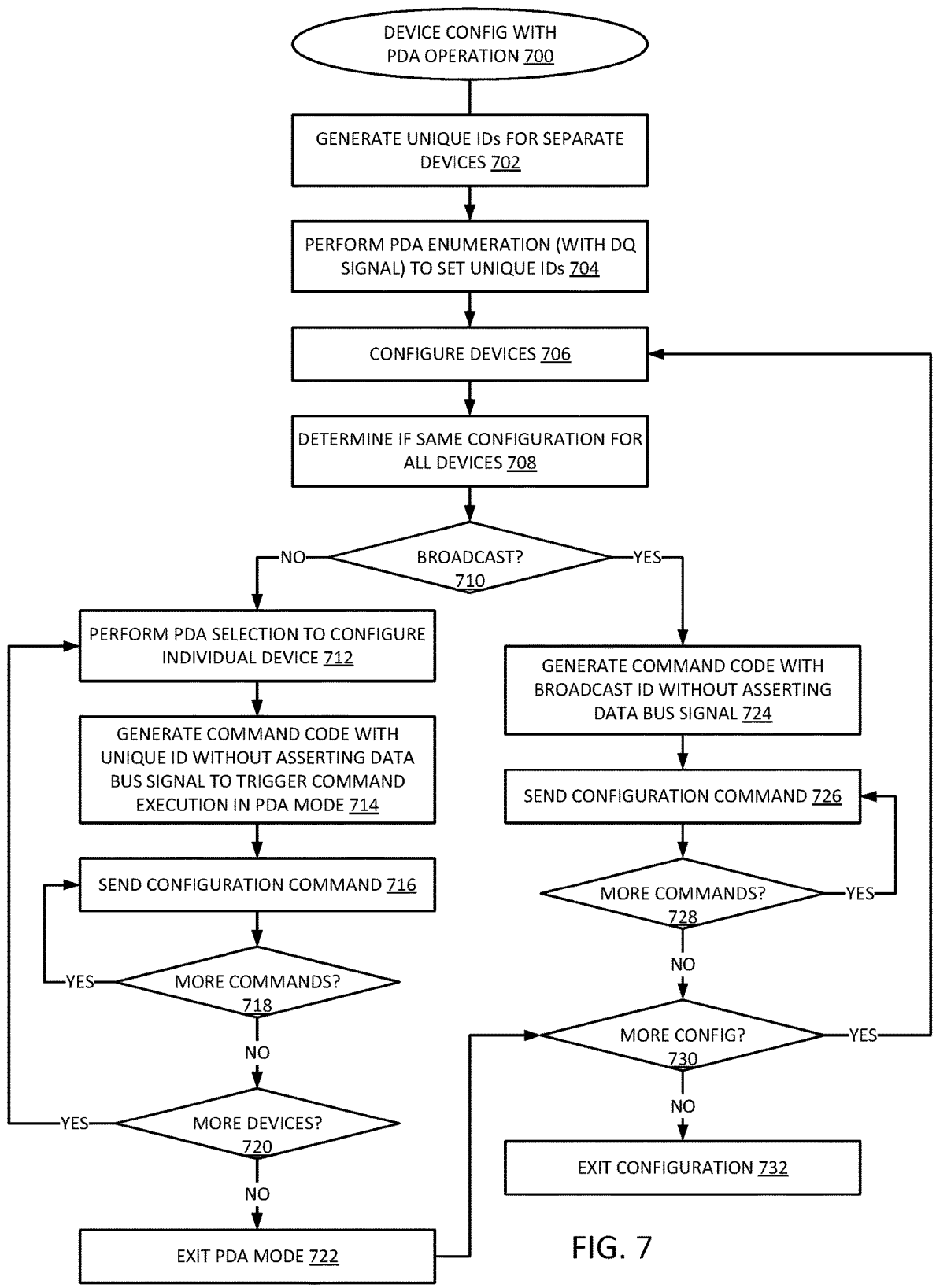
FIG. 7 is a flow diagram of an example of a process for per device addressability.

FIG. 7 is a flow diagram of an example of a process for per device addressability. Process 700 for PDA operation is executed by a host and a group of memory devices associated with the host. As such, process 700 can be implemented by a system in accordance with any example provided, including system 100 of FIG. 1. Alternatively to memory device, the process can function similarly or the same with buffer devices, such as selecting one or more buffer devices of a group of buffer devices. In one example, the memory devices are assigned unique IDs during manufacture or testing or other initialization routine. In one example, the memory subsystem generates unique IDs for the separate device, 702, and sets the unique IDs by performing PDA enumeration, 704. PDA enumeration can occur through generating an enumerate ID command code and asserting a signal on a data bus of the device to be programmed to the enumerate ID.

In one example, the host performs device configuration, 706, which can include device-specific configuration settings. In one example, the host determines if the same configuration should be applied to all devices, 708. If the configuration is not a broadcast setting, 710 NO branch, in one example, the memory device identified as a target by the PDA select ID is selected to configure with individual settings, 712. In one example, the host generates a command code to apply to the memory device targeted with the unique ID without asserting a data bus signal, 714. The command can trigger PDA mode and cause the device to execute the command to set a specific configuration for the device. The host can send a configuration command for the memory device to execute to set the configuration after triggering the specific device with the unique ID command, 716. In one example, the memory device can store the unique ID such that subsequent commands can be issued without needing to assign a unique ID again. For example, configuration for one setting or one setting type can set the unique ID once, and further configuration settings or updating of the configuration settings can use the same unique ID without having to send a command to assign a unique ID. In an implementation where the memory device does not store the unique ID, the arrow can point back to block 714. If there is more than one configuration command to execute, 718 YES branch, the host generates a subsequent configuration command to apply at the memory device, 716.

If there are no more commands, 718 NO branch, in one example, the host determines if there are more devices to program with one or more commands. If there are more devices to provide configuration settings for in PDA mode, 720 YES branch, the host again performs PDA selection with a new unique ID, 712. If one example, if there are no more devices to be configured, 720 NO branch, in one example, the host sends a command to exit the PDA mode, 722.

In one example, if the configuration is to be the same for all devices and the host is to issue a broadcast command, 710 YES branch, the host generates a command code with a broadcast ID without asserting a data bus signal, 724. In one example, the system can apply multiple broadcast commands in sequence. The host can send a configuration command for the memory devices to execute to set the configuration after triggering the memory devices with the broadcast ID command, 726. In one example, the memory device can store the unique ID such that subsequent commands can be issued without needing to assign a unique ID again. In an implementation where the memory device does not store the unique ID, the arrow can point back to block 724. If there are more configuration commands, 728 YES branch, the host can continue to send broadcast commands, 724. If there are no more broadcast command, 728 NO branch, the host can determine if there is more configuration to execute. After exiting PDA mode, the host can determine if there is more configuration to execute. If there is more configuration to perform, 730 YES branch, the system can return to 706 to configure the devices. If there is no more configuration, 730 NO branch, in one example, the system exits configuration, 732.

Figure 8:
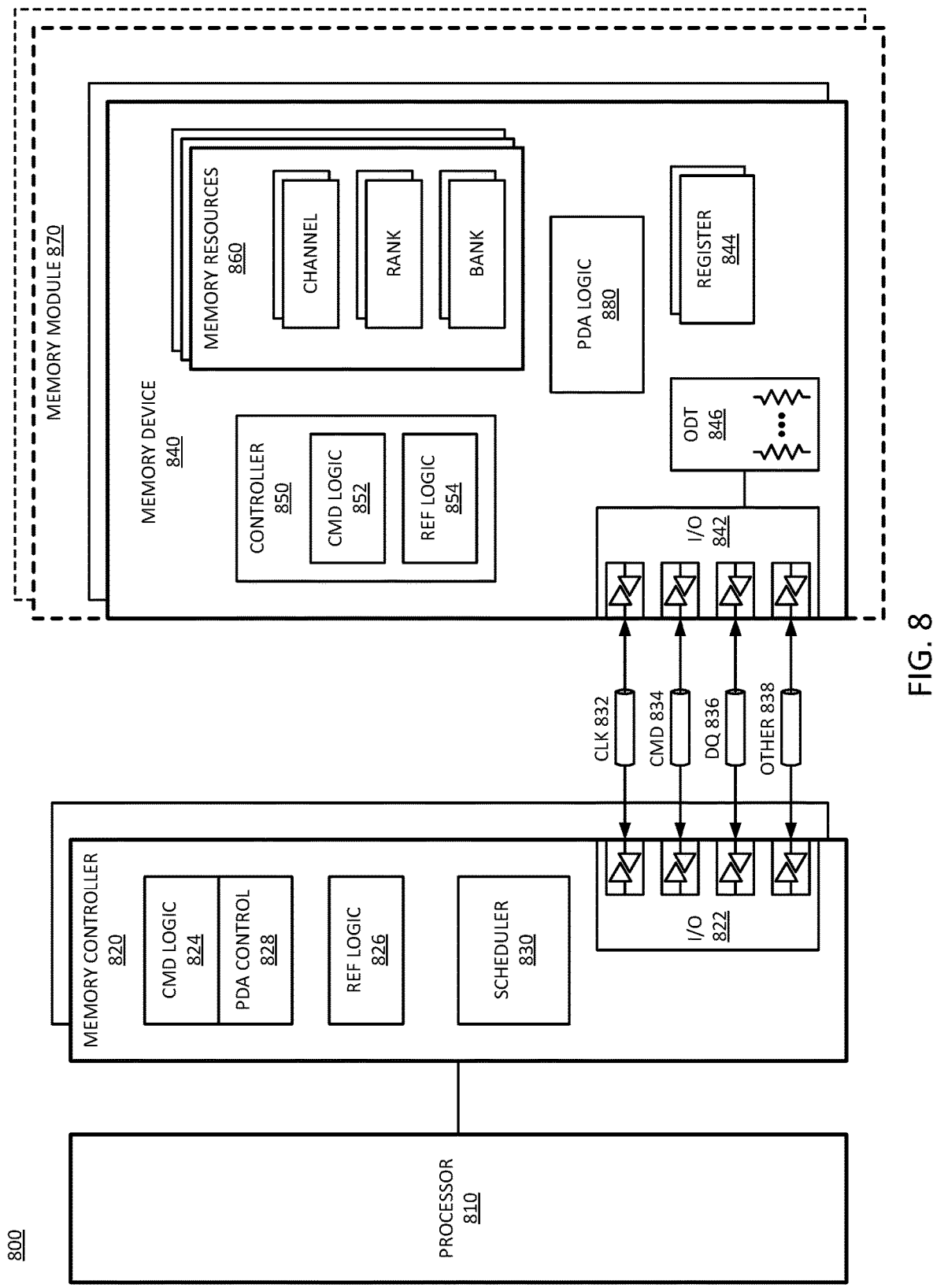
FIG. 8 is a block diagram of an example of a memory subsystem in which per device addressability can be implemented.

FIG. 8 is a block diagram of an example of a memory subsystem in which per device addressability can be implemented. System 800 includes a processor and elements of a memory subsystem in a computing device. System 800 can be in accordance with an example of system 100 of FIG. 1.

In one example, CMD logic 824 includes PDA control logic 828. PDA control 828 enables memory controller 820 to generate per device commands in accordance with any example provided throughout. In one example, the memory controller utilizes a select ID to send a configuration command (e.g., MRW, MPC, VrefCA commands, or others or a combination). Memory device 840 is illustrated to include PDA logic 880, which represents logic within the memory device to receive and process PDA commands in accordance with any example provided throughout. In one example, PDA logic 880 is included in controller 850, such as in CMD logic 852. PDA logic 880 enables the setting of individual settings for one or more configurations stored in register 844. In one example, PDA logic 880 stores or accesses a PDA enumerate ID for memory device 840 to determine if a configuration command is intended for the specific memory device. Memory controller 820 determines what configuration commands to send to all memory devices, and which to send to specific memory devices, and will set the ID accordingly. If a PDA select ID of the configuration command matches the PDA enumerate ID of PDA logic 880, PDA logic 880 will cause memory device 840 to execute the command. A matching ID can include receipt of a broadcast ID. If the command does not match, PDA logic 880 can disregard the command and not execute it.

In one embodiment, PDA control 828 generates a PDA select ID, and PDA logic 880 and PDA control 828 both store PDA enumerate ID. Each memory 840 will store its own PDA enumerate ID, and memory controller 820 will store the enumerate IDs for all devices. In one example, the host assigns the enumerate ID in preparation for setting configuration of memory devices 840. In one example, memory devices 840 are configured with an ID prior to incorporation into system 800, such as at a time of manufacture or testing. In one example, a manufacturer of memory module 870 assigns the enumerate IDs. In one example, enumerate IDs are permanent for the memory devices. In one example, the enumerate IDs are hard-coded into memory device 840. In one example, the enumerate IDs can be changed each time system 800 is initialized (such as on a startup or initialization after being off or in a low power state).

In one example, memory module 870 represents a DIMM, and includes a register (e.g., an RDIMM or registered DIMM). In one example, memory module 870 includes multiple buffers that are separately addressable. In an RDIMM, the register buffers the C/A bus, but the data lines can be buffered. The command bus specific PDA operation as described herein can be utilized in system 800 with or without a register or buffer or registered clock device.

Processor 810 represents a processing unit of a computing platform that may execute an operating system (OS) and applications, which can collectively be referred to as the host or the user of the memory. The OS and applications execute operations that result in memory accesses. Processor 810 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 800 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, JESD79, initial specification published in September 2012 by JEDEC), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, currently in discussion by JEDEC), LPDDR5 (currently in discussion by JEDEC), HBM2 ((HBM version 2), currently in discussion by JEDEC), or others or combinations of memory technologies, and technologies based on derivatives or extensions of such specifications.

In addition to, or alternatively to, volatile memory, in one example, reference to memory devices can refer to a nonvolatile memory device whose state is determinate even if power is interrupted to the device. In one example, the nonvolatile memory device is a block addressable memory device, such as NAND or NOR technologies. Thus, a memory device can also include a future generation nonvolatile devices, such as a three dimensional crosspoint memory device, other byte addressable nonvolatile memory devices, or memory devices that use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one example, a system with volatile memory that needs to be refreshed can also include nonvolatile memory.

Memory controller 820 represents one or more memory controller circuits or devices for system 800. Memory controller 820 represents control logic that generates memory access commands in response to the execution of operations by processor 810. Memory controller 820 accesses one or more memory devices 840. Memory devices 840 can be DRAM devices in accordance with any referred to above. In one example, memory devices 840 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 820 manages a separate memory channel, although system 800 can be configured to have multiple channels managed by a single controller, or to have multiple controllers on a single channel. In one example, memory controller 820 is part of host processor 810, such as logic implemented on the same die or implemented in the same package space as the processor.

Memory controller 820 includes I/O interface logic 822 to couple to a memory bus, such as a memory channel as referred to above. I/O interface logic 822 (as well as I/O interface logic 842 of memory device 840) can include pins, pads, connectors, signal lines, traces, or wires, or other hardware to connect the devices, or a combination of these. I/O interface logic 822 can include a hardware interface. As illustrated, I/O interface logic 822 includes at least drivers/transceivers for signal lines. Commonly, wires within an integrated circuit interface couple with a pad, pin, or connector to interface signal lines or traces or other wires between devices. I/O interface logic 822 can include drivers, receivers, transceivers, or termination, or other circuitry or combinations of circuitry to exchange signals on the signal lines between the devices. The exchange of signals includes at least one of transmit or receive. While shown as coupling I/O 822 from memory controller 820 to I/O 842 of memory device 840, it will be understood that in an implementation of system 800 where groups of memory devices 840 are accessed in parallel, multiple memory devices can include I/O interfaces to the same interface of memory controller 820. In an implementation of system 800 including one or more memory modules 870, I/O 842 can include interface hardware of the memory module in addition to interface hardware on the memory device itself. Other memory controllers 820 will include separate interfaces to other memory devices 840.

The bus between memory controller 820 and memory devices 840 can be implemented as multiple signal lines coupling memory controller 820 to memory devices 840. The bus may typically include at least clock (CLK) 832, command/address (CMD) 834, and write data (DQ) and read data (DQ) 836, and zero or more other signal lines 838. In one example, a bus or connection between memory controller 820 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 800 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 820 and memory devices 840. An example of a serial bus technology is 8B10B encoding and transmission of high-speed data with embedded clock over a single differential pair of signals in each direction. In one example, CMD 834 represents signal lines shared in parallel with multiple memory devices. In one example, multiple memory devices share encoding command signal lines of CMD 834, and each has a separate chip select (CS_n) signal line to select individual memory devices.

It will be understood that in the example of system 800, the bus between memory controller 820 and memory devices 840 includes a subsidiary command bus CMD 834 and a subsidiary bus to carry the write and read data, DQ 836. In one example, the data bus can include bidirectional lines for read data and for write/command data. In another example, the subsidiary bus DQ 836 can include unidirectional write signal lines for write and data from the host to memory, and can include unidirectional lines for read data from the memory to the host. In accordance with the chosen memory technology and system design, other signals 838 may accompany a bus or sub bus, such as strobe lines DQS. Based on design of system 800, or implementation if a design supports multiple implementations, the data bus can have more or less bandwidth per memory device 840. For example, the data bus can support memory devices that have either a x32 interface, a x16 interface, a x8 interface, or other interface. The convention "xW," where W is an integer that refers to an interface size or width of the interface of memory device 840, which represents a number of signal lines to exchange data with memory controller 820. The interface size of the memory devices is a controlling factor on how many memory devices can be used concurrently per channel in system 800 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 840 and memory controller 820 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device 840 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 840 represent memory resources for system 800. In one example, each memory device 840 is a separate memory die. In one example, each memory device 840 can interface with multiple (e.g., 2) channels per device or die. Each memory device 840 includes I/O interface logic 842, which has a bandwidth determined by the implementation of the device (e.g., x16 or x8 or some other interface bandwidth). I/O interface logic 842 enables the memory devices to interface with memory controller 820. I/O interface logic 842 can include a hardware interface, and can be in accordance with I/O 822 of memory controller, but at the memory device end. In one example, multiple memory devices 840 are connected in parallel to the same command and data buses. In another example, multiple memory devices 840 are connected in parallel to the same command bus, and are connected to different data buses. For example, system 800 can be configured with multiple memory devices 840 coupled in parallel, with each memory device responding to a command, and accessing memory resources 860 internal to each. For a Write operation, an individual memory device 840 can write a portion of the overall data word, and for a Read operation, an individual memory device 840 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word will be provided or received by other memory devices in parallel.

In one example, memory devices 840 are disposed directly on a motherboard or host system platform (e.g., a PCB (printed circuit board) on which processor 810 is disposed) of a computing device. In one example, memory devices 840 can be organized into memory modules 870. In one example, memory modules 870 represent dual inline memory modules (DIMMs). In one example, memory modules 870 represent other organization of multiple memory devices to share at least a portion of access or control circuitry, which can be a separate circuit, a separate device, or a separate board from the host system platform. Memory modules 870 can include multiple memory devices 840, and the memory modules can include support for multiple separate channels to the included memory devices disposed on them. In another example, memory devices 840 may be incorporated into the same package as memory controller 820, such as by techniques such as multi-chip-module (MCM), package-on-package, through-silicon via (TSV), or other techniques or combinations. Similarly, in one example, multiple memory devices 840 may be incorporated into memory modules 870, which themselves may be incorporated into the same package as memory controller 820. It will be appreciated that for these and other implementations, memory controller 820 may be part of host processor 810.

Memory devices 840 each include memory resources 860. Memory resources 860 represent individual arrays of memory locations or storage locations for data. Typically memory resources 860 are managed as rows of data, accessed via wordline (rows) and bitline (individual bits within a row) control. Memory resources 860 can be organized as separate channels, ranks, and banks of memory. Channels may refer to independent control paths to storage locations within memory devices 840. Ranks may refer to common locations across multiple memory devices (e.g., same row addresses within different devices). Banks may refer to arrays of memory locations within a memory device 840. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 840 include one or more registers 844. Register 844 represents one or more storage devices or storage locations that provide configuration or settings for the operation of the memory device. In one example, register 844 can provide a storage location for memory device 840 to store data for access by memory controller 820 as part of a control or management operation. In one example, register 844 includes one or more Mode Registers. In one example, register 844 includes one or more multipurpose registers. The configuration of locations within register 844 can configure memory device 840 to operate in different "modes," where command information can trigger different operations within memory device 840 based on the mode. Additionally or in the alternative, different modes can also trigger different operation from address information or other signal lines depending on the mode. Settings of register 844 can indicate configuration for I/O settings (e.g., timing, termination or ODT (on-die termination) 846, driver configuration, or other I/O settings).

In one example, memory device 840 includes ODT 846 as part of the interface hardware associated with I/O 842. ODT 846 can be configured as mentioned above, and provide settings for impedance to be applied to the interface to specified signal lines. In one example, ODT 846 is applied to DQ signal lines. In one example, ODT 846 is applied to command signal lines. In one example, ODT 846 is applied to address signal lines. In one example, ODT 846 can be applied to any combination of the preceding. The ODT settings can be changed based on whether a memory device is a selected target of an access operation or a non-target device. ODT 846 settings can affect the timing and reflections of signaling on the terminated lines. Careful control over ODT 846 can enable higher-speed operation with improved matching of applied impedance and loading. ODT 846 can be applied to specific signal lines of I/O interface 842, 822, and is not necessarily applied to all signal lines.

Memory device 840 includes controller 850, which represents control logic within the memory device to control internal operations within the memory device. For example, controller 850 decodes commands sent by memory controller 820 and generates internal operations to execute or satisfy the commands. Controller 850 can be referred to as an internal controller, and is separate from memory controller 820 of the host. Controller 850 can determine what mode is selected based on register 844, and configure the internal execution of operations for access to memory resources 860 or other operations based on the selected mode. Controller 850 generates control signals to control the routing of bits within memory device 840 to provide a proper interface for the selected mode and direct a command to the proper memory locations or addresses. Controller 850 includes command logic 852, which can decode command encoding received on command and address signal lines. Thus, command logic 852 can be or include a command decoder. With command logic 852, memory device can identify commands and generate internal operations to execute requested commands.

Referring again to memory controller 820, memory controller 820 includes command (CMD) logic 824, which represents logic or circuitry to generate commands to send to memory devices 840. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 840, memory controller 820 can issue commands via I/O 822 to cause memory device 840 to execute the commands. In one example, controller 850 of memory device 840 receives and decodes command and address information received via I/O 842 from memory controller 820. Based on the received command and address information, controller 850 can control the timing of operations of the logic and circuitry within memory device 840 to execute the commands. Controller 850 is responsible for compliance with standards or specifications within memory device 840, such as timing and signaling requirements. Memory controller 820 can implement compliance with standards or specifications by access scheduling and control.

Memory controller 820 includes scheduler 830, which represents logic or circuitry to generate and order transactions to send to memory device 840. From one perspective, the primary function of memory controller 820 could be said to schedule memory access and other transactions to memory device 840. Such scheduling can include generating the transactions themselves to implement the requests for data by processor 810 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 820 typically includes logic such as scheduler 830 to allow selection and ordering of transactions to improve performance of system 800. Thus, memory controller 820 can select which of the outstanding transactions should be sent to memory device 840 in which order, which is typically achieved with logic much more complex that a simple first-in first-out algorithm. Memory controller 820 manages the transmission of the transactions to memory device 840, and manages the timing associated with the transaction. In one example, transactions have deterministic timing, which can be managed by memory controller 820 and used in determining how to schedule the transactions with scheduler 830.

In one example, memory controller 820 includes refresh (REF) logic 826. Refresh logic 826 can be used for memory resources that are volatile and need to be refreshed to retain a deterministic state. In one example, refresh logic 826 indicates a location for refresh, and a type of refresh to perform. Refresh logic 826 can trigger self-refresh within memory device 840, or execute external refreshes which can be referred to as auto refresh commands) by sending refresh commands, or a combination. In one example, system 800 supports all bank refreshes as well as per bank refreshes. All bank refreshes cause the refreshing of banks within all memory devices 840 coupled in parallel. Per bank refreshes cause the refreshing of a specified bank within a specified memory device 840. In one example, controller 850 within memory device 840 includes refresh logic 854 to apply refresh within memory device 840. In one example, refresh logic 854 generates internal operations to perform refresh in accordance with an external refresh received from memory controller 820. Refresh logic 854 can determine if a refresh is directed to memory device 840, and what memory resources 860 to refresh in response to the command.

Figure 9:
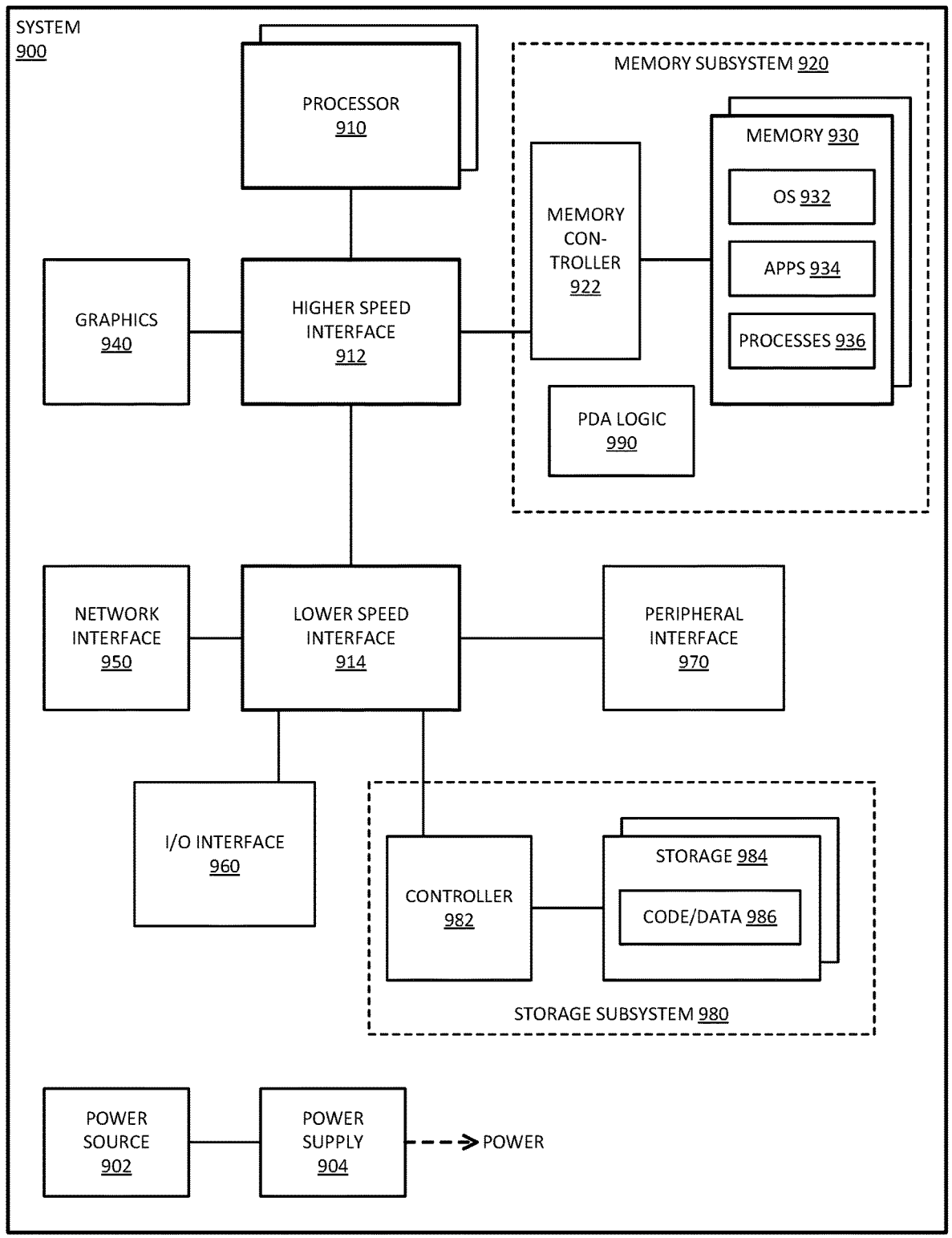
FIG. 9 is a block diagram of an example of a computing system in which a memory system with per device addressability can be implemented.

FIG. 9 is a block diagram of an example of a computing system in which a memory system with per device addressability can be implemented. System 900 represents a computing device in accordance with any example herein, and can be a laptop computer, a desktop computer, a tablet computer, a server, a gaming or entertainment control system, embedded computing device, or other electronic device.

In one example, system 900 includes PDA logic 990 in memory subsystem 920, which represents all hardware and other logic to implement PDA operation based on command encoding without the use of non-command signal lines, in accordance with any example provided. PDA logic 990 is implemented between memory controller 922 and memory 930. Memory controller 922 can set an enumerate ID for each memory device, and then select PDA operation based on the ID without having to use a data bus signal line to identify a specific device. In such a mode memory controller 922 can program device-specific settings for memory 930. Memory 930 can watch for PDA commands or MPC commands with a select ID that matches a stored, assigned enumerate ID, or is a broadcast ID. For commands that match either the unique ID or a broadcast ID, the memory device process and execute such commands. For commands without a matching select ID, memory 930 can ignore the commands.

System 900 includes processor 910 can include any type of microprocessor, central processing unit (CPU), graphics processing unit (GPU), processing core, or other processing hardware, or a combination, to provide processing or execution of instructions for system 900. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or a combination of such devices.

In one example, system 900 includes interface 912 coupled to processor 910, which can represent a higher speed interface or a high throughput interface for system components that need higher bandwidth connections, such as memory subsystem 920 or graphics interface components 940. Interface 912 represents an interface circuit, which can be a standalone component or integrated onto a processor die. Interface 912 can be integrated as a circuit onto the processor die or integrated as a component on a system on a chip. Where present, graphics interface 940 interfaces to graphics components for providing a visual display to a user of system 900. Graphics interface 940 can be a standalone component or integrated onto the processor die or system on a chip. In one example, graphics interface 940 can drive a high definition (HD) display that provides an output to a user. In one example, the display can include a touchscreen display. In one example, graphics interface 940 generates a display based on data stored in memory 930 or based on operations executed by processor 910 or both.

Memory subsystem 920 represents the main memory of system 900, and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910, such as integrated onto the processor die or a system on a chip.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 900 includes interface 914, which can be coupled to interface 912. Interface 914 can be a lower speed interface than interface 912. In one example, interface 914 represents an interface circuit, which can include stand-alone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can exchange data with a remote device, which can include sending data stored in memory or receiving data to be stored in memory.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one example, storage subsystem 980 includes controller 982 to interface with storage 984. In one example controller 982 is a physical part of interface 914 or processor 910, or can include circuits or logic in both processor 910 and interface 914.

Power source 902 provides power to the components of system 900. More specifically, power source 902 typically interfaces to one or multiple power supplies 904 in system 902 to provide power to the components of system 900. In one example, power supply 904 includes an AC to DC (alternating current to direct current) adapter to plug into a wall outlet. Such AC power can be renewable energy (e.g., solar power) power source 902. In one example, power source 902 includes a DC power source, such as an external AC to DC converter. In one example, power source 902 or power supply 904 includes wireless charging hardware to charge via proximity to a charging field. In one example, power source 902 can include an internal battery or fuel cell source.

Figure 10:
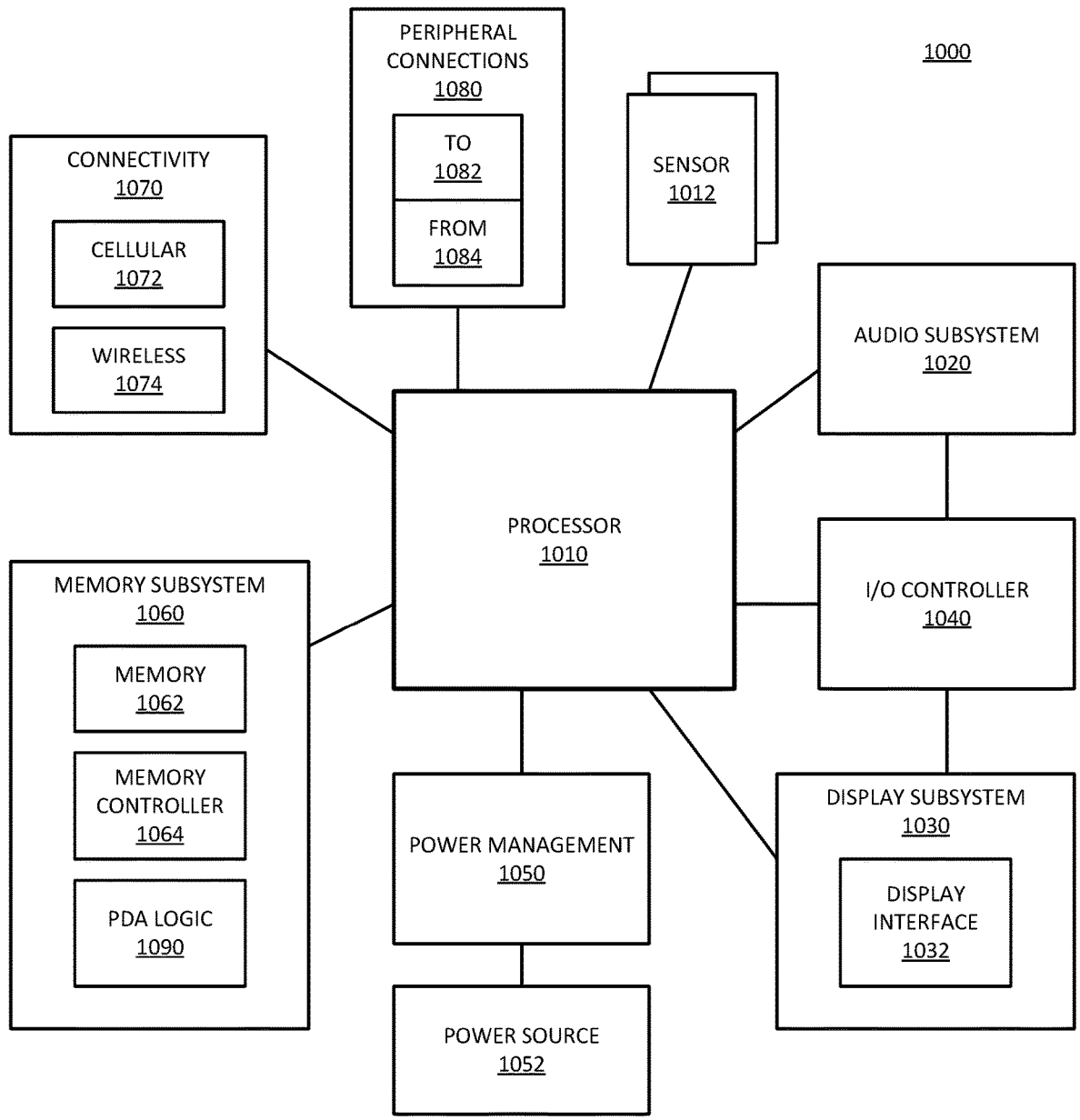
FIG. 10 is a block diagram of an example of a mobile device in which a memory system with per device addressability can be implemented.

FIG. 10 is a block diagram of an example of a mobile device in which a memory system with per device addressability can be implemented. Device 1000 represents a mobile computing device, such as a computing tablet, a mobile phone or smartphone, wearable computing device, or other mobile device, or an embedded computing device. It will be understood that certain of the components are shown generally, and not all components of such a device are shown in device 1000.

In one example, system 1000 includes PDA logic 1090 in memory subsystem 1060, which represents all hardware and other logic to implement PDA operation based on command encoding without the use of non-command signal lines, in accordance with any example provided. PDA logic 1090 is implemented between memory controller 1064 and memory 1062. Memory controller 1064 can set an enumerate ID for each memory device, and then select PDA operation based on the ID without having to use a data bus signal line to identify a specific device. In such a mode memory controller 1064 can program device-specific settings for memory 1062. Memory 1062 can watch for PDA commands or MPC commands with a select ID that matches a stored, assigned enumerate ID, or is a broadcast ID. For commands that match either the unique ID or a broadcast ID, the memory device process and execute such commands. For commands without a matching select ID, memory 1062 can ignore the commands.

Device 1000 includes processor 1010, which performs the primary processing operations of device 1000. Processor 1010 can include one or more physical devices, such as microprocessors, application processors, microcontrollers, programmable logic devices, or other processing means. The processing operations performed by processor 1010 include the execution of an operating platform or operating system on which applications and device functions are executed. The processing operations include operations related to I/O (input/output) with a human user or with other devices, operations related to power management, operations related to connecting device 1000 to another device, or a combination. The processing operations can also include operations related to audio I/O, display I/O, or other interfacing, or a combination. Processor 1010 can execute data stored in memory. Processor 1010 can write or edit data stored in memory.

In one example, system 1000 includes one or more sensors 1012. Sensors 1012 represent embedded sensors or interfaces to external sensors, or a combination. Sensors 1012 enable system 1000 to monitor or detect one or more conditions of an environment or a device in which system 1000 is implemented. Sensors 1012 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1012 can also include sensors for biometric systems such as fingerprint recognition systems, face detection or recognition systems, or other systems that detect or recognize user features. Sensors 1012 should be understood broadly, and not limiting on the many different types of sensors that could be implemented with system 1000. In one example, one or more sensors 1012 couples to processor 1010 via a frontend circuit integrated with processor 1010. In one example, one or more sensors 1012 couples to processor 1010 via another component of system 1000.

In one example, device 1000 includes audio subsystem 1020, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 1000, or connected to device 1000. In one example, a user interacts with device 1000 by providing audio commands that are received and processed by processor 1010.

Display subsystem 1030 represents hardware (e.g., display devices) and software components (e.g., drivers) that provide a visual display for presentation to a user. In one example, the display includes tactile components or touchscreen elements for a user to interact with the computing device. Display subsystem 1030 includes display interface 1032, which includes the particular screen or hardware device used to provide a display to a user. In one example, display interface 1032 includes logic separate from processor 1010 (such as a graphics processor) to perform at least some processing related to the display. In one example, display subsystem 1030 includes a touchscreen device that provides both output and input to a user. In one example, display subsystem 1030 includes a high definition (HD) or ultra-high definition (UHD) display that provides an output to a user. In one example, display subsystem includes or drives a touchscreen display. In one example, display subsystem 1030 generates display information based on data stored in memory or based on operations executed by processor 1010 or both.

I/O controller 1040 represents hardware devices and software components related to interaction with a user. I/O controller 1040 can operate to manage hardware that is part of audio subsystem 1020, or display subsystem 1030, or both. Additionally, I/O controller 1040 illustrates a connection point for additional devices that connect to device 1000 through which a user might interact with the system. For example, devices that can be attached to device 1000 might include microphone devices, speaker or stereo systems, video systems or other display device, keyboard or keypad devices, or other I/O devices for use with specific applications such as card readers or other devices.

As mentioned above, I/O controller 1040 can interact with audio subsystem 1020 or display subsystem 1030 or both. For example, input through a microphone or other audio device can provide input or commands for one or more applications or functions of device 1000. Additionally, audio output can be provided instead of or in addition to display output. In another example, if display subsystem includes a touchscreen, the display device also acts as an input device, which can be at least partially managed by I/O controller 1040. There can also be additional buttons or switches on device 1000 to provide I/O functions managed by I/O controller 1040.

In one example, I/O controller 1040 manages devices such as accelerometers, cameras, light sensors or other environmental sensors, gyroscopes, global positioning system (GPS), or other hardware that can be included in device 1000, or sensors 1012. The input can be part of direct user interaction, as well as providing environmental input to the system to influence its operations (such as filtering for noise, adjusting displays for brightness detection, applying a flash for a camera, or other features).

In one example, device 1000 includes power management 1050 that manages battery power usage, charging of the battery, and features related to power saving operation. Power management 1050 manages power from power source 1052, which provides power to the components of system 1000. In one example, power source 1052 includes an AC to DC (alternating current to direct current) adapter to plug into a wall outlet. Such AC power can be renewable energy (e.g., solar power, motion based power). In one example, power source 1052 includes only DC power, which can be provided by a DC power source, such as an external AC to DC converter. In one example, power source 1052 includes wireless charging hardware to charge via proximity to a charging field. In one example, power source 1052 can include an internal battery or fuel cell source.

Memory subsystem 1060 includes memory device(s) 1062 for storing information in device 1000. Memory subsystem 1060 can include nonvolatile (state does not change if power to the memory device is interrupted) or volatile (state is indeterminate if power to the memory device is interrupted) memory devices, or a combination. Memory 1060 can store application data, user data, music, photos, documents, or other data, as well as system data (whether long-term or temporary) related to the execution of the applications and functions of system 1000. In one example, memory subsystem 1060 includes memory controller 1064 (which could also be considered part of the control of system 1000, and could potentially be considered part of processor 1010). Memory controller 1064 includes a scheduler to generate and issue commands to control access to memory device 1062.

Connectivity 1070 includes hardware devices (e.g., wireless or wired connectors and communication hardware, or a combination of wired and wireless hardware) and software components (e.g., drivers, protocol stacks) to enable device 1000 to communicate with external devices. The external device could be separate devices, such as other computing devices, wireless access points or base stations, as well as peripherals such as headsets, printers, or other devices. In one example, system 1000 exchanges data with an external device for storage in memory or for display on a display device. The exchanged data can include data to be stored in memory, or data already stored in memory, to read, write, or edit data.

Connectivity 1070 can include multiple different types of connectivity. To generalize, device 1000 is illustrated with cellular connectivity 1072 and wireless connectivity 1074. Cellular connectivity 1072 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1074 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1080 include hardware interfaces and connectors, as well as software components (e.g., drivers, protocol stacks) to make peripheral connections. It will be understood that device 1000 could both be a peripheral device ("to" 1082) to other computing devices, as well as have peripheral devices ("from" 1084) connected to it. Device 1000 commonly has a "docking" connector to connect to other computing devices for purposes such as managing (e.g., downloading, uploading, changing, synchronizing) content on device 1000. Additionally, a docking connector can allow device 1000 to connect to certain peripherals that allow device 1000 to control content output, for example, to audiovisual or other systems.

In addition to a proprietary docking connector or other proprietary connection hardware, device 1000 can make peripheral connections 1080 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example, a dynamic random access memory (DRAM) device includes a hardware interface to couple to a command bus; a hardware interface to couple to a data bus; and a mode register to store a value to indicate an assigned enumeration identifier (ID), wherein the DRAM device is to receive one or more per-device addressability (PDA) commands via the command bus without a signal via the data bus based on the enumeration ID, wherein the PDA commands include an assigned enumeration ID, and the DRAM device is to process only PDA commands with the assigned enumeration ID to make changes to a configuration setting.

In general with respect to the descriptions herein, in one example, a method includes storing a value to indicate an assigned enumeration identifier (ID), receiving one or more per-device addressability (PDA) commands via the command bus without a signal via the data bus based on the enumeration ID, wherein the PDA commands include an assigned enumeration ID, and the DRAM device is to process only PDA commands with the assigned enumeration ID to make changes to a configuration setting.

In one example, the DRAM device is to store a value to indicate whether a PDA enumeration mode of the DRAM device is enabled, wherein in the PDA enumeration mode, the DRAM device is to receive an enumeration ID command via the command bus in conjunction with a signal via the data bus to assign the enumeration ID. In one example, in PDA enumeration mode the DRAM device is to receive the enumeration ID command in conjunction with a signal on data bus signal line DQ0. In one example, the enumeration ID is assigned via fuses or strap pins. In one example, the one or more PDA commands comprise multipurpose commands (MPCs) including the enumeration ID as a field in the MPC. In one example, the DRAM device is to wait at least a burst length of transfer cycles after the enumeration ID command before processing PDA commands. In one example, the one or more PDA commands comprise device-specific programming of an on-die termination (ODT) parameter for either the hardware interface to the command bus or the hardware interface to the data bus. In one example, the one or more PDA commands comprise device-specific programming of an input/output (I/O) parameter to program voltage, current, or timing, or a combination of these, for the hardware interface to the data bus. In one example, the one or more PDA commands comprise device-specific programming of a differential feedback equalization (DFE) parameter for the hardware interface to the data bus. In one example, the DRAM device is to store the assigned enumeration ID for a subsequent sequence of PDA configuration commands. In one example, the DRAM device comprises a synchronous dynamic random access memory (SDRAM) device compatible with a double data rate (DDR) standard.

In general with respect to the descriptions, in one example, a memory controller includes: a hardware interface to couple to a device of a memory subsystem via a command bus; a hardware interface to couple to the device via a data bus; and a scheduler to set a mode register of the device to trigger a per-device addressability (PDA) enumeration mode, wherein in the PDA enumeration mode, the scheduler is to generate a enumeration identifier (ID) command via the command bus in conjunction with a signal via the data bus to assign an enumeration ID, and after sending the enumeration ID command, generate one or more PDA commands for the device via the command bus without a signal via the data bus, wherein the PDA commands include the assigned enumeration ID to indicate that only the device of a group of multiple devices is to process the PDA commands to make changes to a configuration setting.

In general with respect to the descriptions, in one example, a method includes: setting a mode register of a device to trigger a per-device addressability (PDA) enumeration mode, wherein in the PDA enumeration mode, generating a enumeration identifier (ID) command via the command bus in conjunction with a signal via the data bus to assign an enumeration ID, and after sending the enumeration ID command, generating one or more PDA commands for the device via the command bus without a signal via the data bus, wherein the PDA commands include the assigned enumeration ID to indicate that only the device of a group of multiple devices is to process the PDA commands to make changes to a configuration setting.

In one example, the scheduler is to generate the enumeration ID command in conjunction with a signal on data bus signal line DQ0. In one example, the one or more PDA commands comprise multipurpose commands (MPCs)

including the enumeration ID as a field in the MPC. In one example, the scheduler is to wait at least a burst length of transfer cycles after the enumeration ID command before sending the PDA commands. In one example, the one or more PDA commands comprise device-specific programming of an on-die termination (ODT) parameter for a configuration setting for a hardware interface of the device to the command bus or a hardware interface of the device to the data bus. In one example, the one or more PDA commands comprise device-specific programming of an input/output (I/O) parameter to program a configuration setting to set a voltage, current, or timing, or a combination of these, for a hardware interface of the device to the data bus. In one example, the one or more PDA commands comprise device-specific programming of a differential feedback equalization (DFE) parameter to set a configuration parameter of a hardware interface of the device to the data bus. In one example, the device comprises a synchronous dynamic random access memory (SDRAM) device compatible with a double data rate (DDR) standard. In one example, the device comprises a buffer of a memory module.

In general with respect to the descriptions, in one example, a system includes: a command bus; a data bus; a memory controller coupled to the command bus and to the data bus; and a memory module including multiple devices coupled to the command bus and to the data bus, the devices including a register to store a value to indicate whether a per-device addressability (PDA) enumeration mode of the device is enabled, wherein in the PDA enumeration mode, the device is to receive an enumeration identifier (ID) command via the command bus in conjunction with a signal via data bus to assign an enumeration ID, wherein after receipt of the enumeration ID command, the device is to receive one or more PDA commands via the command bus without a signal via the data bus, wherein the PDA commands include an assigned enumeration ID to indicate that only selected one or more devices of the multiple devices are to process the PDA command to make changes to a configuration setting.

In one example, in PDA enumeration mode the device is to receive the enumeration ID command in conjunction with a signal on data bus signal line DQ0. In one example, the one or more PDA commands comprise multipurpose commands (MPCs) including the enumeration ID as a field in the MPC. In one example, the one or more PDA commands comprise: device-specific programming of an on-die termination (ODT) parameter for either the hardware interface of the device to the command bus or the hardware interface of the device to the data bus; device-specific programming of an input/output (I/O) parameter to program voltage, current, or timing, or a combination of these, for the hardware interface of the device to the data bus; or, device-specific programming of a differential feedback equalization (DFE) parameter for the hardware interface of the device to the data bus. In one example, the device comprises a dynamic random access memory (DRAM) device or a buffer device. In one example, the system further includes: a host processor device coupled to the memory controller; a display communicatively coupled to a host processor; a network interface communicatively coupled to a host processor; or a battery to power the system.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A dynamic random access memory (DRAM) device, comprising:
 a hardware interface to couple to a command bus;
 a hardware interface to couple to a data bus; and
 a mode register to store a value to indicate an assigned enumeration identifier (ID), wherein the DRAM device is to first receive a per-device addressability (PDA) command via the command bus accompanied by a signal via the data bus, and one or more subsequent PDA commands via the command bus without a signal via the data bus based on the assigned enumeration ID, wherein the subsequent PDA commands include the assigned enumeration ID, and the DRAM device is to process only PDA commands with the assigned enumeration ID to make changes to a configuration setting.

2. The DRAM device of claim 1, wherein the DRAM device is to store a value to indicate whether a PDA enumeration mode of the DRAM device is enabled, wherein in the PDA enumeration mode, the DRAM device is to receive an enumeration ID command via the command bus in conjunction with a signal via the data bus to assign the enumeration ID.

3. The DRAM device of claim 2, wherein in PDA enumeration mode the DRAM device is to receive the enumeration ID command in conjunction with a signal on data bus signal line DQ0.

4. The DRAM device of claim 2, wherein the enumeration ID is assigned via fuses or strap pins.

5. The DRAM device of claim 1, wherein the one or more PDA commands comprise multipurpose commands (MPCs) including the enumeration ID as a field in the MPCs.

6. The DRAM device of claim 5, wherein the DRAM device is to wait at least a burst length of transfer cycles after the enumeration ID command before processing PDA commands.

7. The DRAM device of claim 1, wherein the one or more PDA commands comprise device-specific programming of an on-die termination (ODT) parameter for either the hardware interface to the command bus or the hardware interface to the data bus.

8. The DRAM device of claim 1, wherein the one or more PDA commands comprise device-specific programming of an input/output (I/O) parameter to program voltage, current, or timing, or a combination of these, for the hardware interface to the data bus.

9. The DRAM device of claim 1, wherein the one or more PDA commands comprise device-specific programming of a differential feedback equalization (DFE) parameter for the hardware interface to the data bus.

10. The DRAM device of claim 1, wherein the DRAM device is to store the assigned enumeration ID for a subsequent sequence of PDA configuration commands.

11. The DRAM device of claim 1, wherein the DRAM device comprises a synchronous dynamic random access memory (SDRAM) device compatible with a double data rate (DDR) standard.

12. A memory controller comprising:
a hardware interface to couple to a device of a memory subsystem via a command bus;
a hardware interface to couple to the device via a data bus; and
a scheduler to set a mode register of the device to trigger a per-device addressability (PDA) enumeration mode, wherein in the PDA enumeration mode, the scheduler is to generate a enumeration identifier (ID) command via the command bus in conjunction with a signal via the data bus to assign an enumeration ID, and after sending of the enumeration ID command, generate one or more PDA commands for the device via the command bus without a signal via the data bus, wherein the PDA commands include the assigned enumeration ID to indicate that only the device of a group of multiple devices is to process the PDA commands to make changes to a configuration setting.

13. The memory controller of claim 12, wherein the scheduler is to generate the enumeration ID command in conjunction with a signal on data bus signal line DQ0.

14. The memory controller of claim 12, wherein the one or more PDA commands comprise multipurpose commands (MPCs) including the enumeration ID as a field in the MPCs.

15. The memory controller of claim 14, wherein the scheduler is to wait at least a burst length of transfer cycles after the enumeration ID command before sending the PDA commands.

16. The memory controller of claim 12, wherein the one or more PDA commands comprise:
device-specific programming of an on-die termination (ODT) parameter for a configuration setting for the hardware interface of the device to the command bus or the hardware interface of the device to the data bus; or
device-specific programming of an input/output (I/O) parameter to program a configuration setting to set a voltage, current, or timing, or a combination of these, for the hardware interface of the device to the data bus; or
device-specific programming of a differential feedback equalization (DFE) parameter to set a configuration parameter of the hardware interface of the device to the data bus.

17. The memory controller of claim 12, wherein the device comprises a synchronous dynamic random access memory (SDRAM) device compatible with a double data rate (DDR) standard or a buffer of a memory module.

18. A system comprising:
a command bus;
a data bus;
a memory controller coupled to the command bus and to the data bus; and
a memory module including multiple devices coupled to the command bus and to the data bus, each device of the multiple devices including
a register to store a value to indicate whether a per-device addressability (PDA) enumeration mode of the device is enabled, wherein in the PDA enumeration mode, the device is to receive an enumeration identifier (ID) command via the command bus in conjunction with a signal via data bus to assign an enumeration ID, wherein after receipt of the enumeration ID command, the device is to receive one or more PDA commands via the command bus without a signal via the data bus, wherein the PDA commands include an assigned enumeration ID to indicate that only selected one or more devices of the multiple devices are to process the PDA command to make changes to a configuration setting.

19. The system of claim 18, wherein in PDA enumeration mode a device of the multiple devices is to receive the enumeration ID command in conjunction with a signal on data bus signal line DQ0.

20. The system of claim 18, wherein the one or more PDA commands comprise multipurpose commands (MPCs) including the enumeration ID as a field in the MPC.

21. The system of claim 18, wherein the one or more PDA commands comprise:
device-specific programming of an on-die termination (ODT) parameter for either a hardware interface of a device of the multiple devices to the command bus or a hardware interface of the device of the multiple devices to the data bus;
device-specific programming of an input/output (I/O) parameter to program voltage, current, or timing, or a combination of these, for a hardware interface of a device of the multiple devices to the data bus; or,
device-specific programming of a differential feedback equalization (DFE) parameter for a hardware interface of a device of the multiple devices to the data bus.

22. The system of claim 18, wherein the devices comprise a dynamic random access memory (DRAM) devices or buffer devices.

23. The system of claim 18, further comprising:
a host processor device coupled to the memory controller;
a display communicatively coupled to a host processor;
a network interface communicatively coupled to a host processor; or
a battery to power the system.

* * * * *